United States Patent [19]

Gormley et al.

[11] 3,876,837

[45] Apr. 8, 1975

[54] SEQUENCER FOR AUTOMATIC ANSWERING AND DISCONNECTING DEVICE FOR TELEPHONE INTERFACED FACSIMILE TERMINALS

[75] Inventors: Robert J. Gormley, Rochester; Charles S. Yole, Pittsford, both of N.Y.

[73] Assignee: Xerox Corporation, Stamford, Conn.

[22] Filed: Feb. 28, 1973

[21] Appl. No.: 336,597

[52] U.S. Cl. .................. 179/4; 179/6 AC; 179/2 C; 179/1 C

[51] Int. Cl. .......................................... H04m 11/06

[58] Field of Search ......... 179/3, 4, 2 DP, 2 A, 2 C, 179/1 C, 6 AC, 6 R

[56] References Cited

UNITED STATES PATENTS

| | | | |
|---|---|---|---|
| 1,159,040 | 11/1915 | Joleen | 340/253 |
| 3,347,987 | 10/1967 | Chaloupka | 179/2 A |
| 3,401,396 | 9/1968 | Wolf et al. | 179/2 DP |
| 3,505,474 | 4/1970 | Quatse | 179/2 DP |
| 3,527,893 | 9/1970 | Honobe | 179/6 AC |
| 3,549,809 | 12/1970 | Stehr | 179/2 DP |
| 3,557,312 | 1/1971 | Vogelman | 179/6 AC |
| 3,609,241 | 9/1971 | Riethmeier | 179/4 |
| 3,656,136 | 4/1972 | Blair | 340/253 |
| 3,739,338 | 6/1973 | Jacobson | 179/2 DP |

*Primary Examiner*—Kathleen H. Claffy
*Assistant Examiner*—Thomas D'Amico

[57] ABSTRACT

A controller for automatically answering and disconnecting calls to and from telephone interfaced facsimile terminals is compatible with conventional installations of ordinary telephone sets. The controller comprises an actuator arm for mechanically operating the cradle switch of an associated telephone set, a driver for the actuator arm, and a control circuit for the driver. If desired, the controller may be overriden by disengaging the actuator arm from the driver. Otherwise, however, the actuator arm is moved away from and toward the cradle switch by the driver in response to control signals supplied by the control circuit. To that end, incoming calls to be answered are sensed by inductively detecting any ringing voltage applied to the telephone set, and incoming or outgoing calls to be disconnected are sensed by a "time out" operation which is initiated whenever the associated facsimile unit stops while the telephone set is "off-hook."

16 Claims, 22 Drawing Figures

SEQUENCER FOR AUTOMATIC ANSWERING AND DISCONNECTING DEVICE FOR TELEPHONE INTERFACED FACSIMILE TERMINALS

BACKGROUND OF THE INVENTION

This invention relates, generally, to the automation of telephone interfaced facsimile terminals and, more particularly, to controllers for automatically answering and disconnecting calls to and from such terminals. An important feature is that the controllers are compatible with conventional installations of ordinary telephone sets.

Facsimile systems are characterized by the ability to produce a more or less exact copy or "facsimile" of an original document at a remote location in a matter of just a few minutes. A basic system comprises a pair of terminals which are interconnected, usually only when the need arises, by a communications link. The terminals are typically equipped with transceivers so that each of them is selectively operable in either a transmit mode or a receive mode, but dedicated transmitters and receivers may also be employed.

In operation of such a system, the information content of the document of interest is converted at the transmitting terminal into a series of video signals. These signals (or, more commonly, a carrier modulated by them) are then transmitted through the communications link to the receiving terminal. At that point, the video signals are utilized, together with suitable remotely or locally generated synchronizing and phasing signals, to drive a printer which, in turn, produces a copy or facsimile of the original document.

The mounting demand for rapid and accurate communication of graphic information (e.g., written and printed materials, drawings, and sketches) has spurred the development of the facsimile art. The public switched telephone network has become a favored transmission medium for facsimile communications because subscribers may rely on it to provide a communication link to and from almost any location without having to remake a substantial capital investment in telephone equipment, and equipment has been developed to carry out telephonic facsimile communications. Thus, the problem which remains to be solved centers on improving the cost effectiveness of telephonic facsimile communications within the constraints imposed by existing tariff regulations which require that there be a suitable interface between the telephone network and any facsimile equipment coupled thereto to protect the telephone network from being damaged in the event of a failure within the facsimile equipment.

Others have previously recognized that the costs of telephonic facsimile communications may be reduced by equipping the facsimile terminals to automatically answer and disconnect incoming and outgoing calls. However, the various approaches which have been previously proposed for achieving such automation have not been entirely satisfactory. For example, as disclosed and claimed in Reithmeir U.S. Pat. Nos. 3,586,778 and 3,608,241 which issued June 22, 1971 and Sept. 28, 1971, respectively, on applications assigned to the assignee of this application, one proposal has been to satisfy the interfacing requirement with special electronic equipment which is capable of automatically answering and disconnecting calls. The technical merit and commercial potential of that approach is unquestioned. It does, however, suffer from the practical disadvantage that such special electronic interfacing equipment must be interposed between the telephone set and the balance of the telephone equipment with the result that it often cannot be installed or even serviced without the cooperation of the telephone company and the participation of a highly skilled telephone technician.

Experience has shown that users of telephonic facsimile equipment generally prefer to avoid the burdens and other inconveniences associated with special telephone installations. Thus, acoustic couplers and inductive couplers (hereinafter sometimes collectively referred to for convenience as "transducer couplers") have been developed to satisfy the interfacing requirement with equipment which is compatible with conventional installations of ordinary telephone sets of the type that are routinely employed for voice communications. Specifically, transducer couplers are characterized by not requiring any direct electrical connection to any of the telephone equipment.

Heretofore, however, transducer type couplers have also usually been associated with a requirement that the facsimile terminals be manned on a more or less continuous basis. Indeed, as noted in the aforementioned Reithmeier U.S. patents, this requirement is one of the principal disadvantages of such couplers. Clearly, the practice of manning each facsimile terminal substantially continuously is wasteful of the time and energy the terminal operators might otherwise devote to other tasks. Also, it tends to discourage facsimile users from taking full advantage of the lower telephone toll rates often prevailing outside normal business hours. Nevertheless, the practice persists without substantial abatement.

SUMMARY OF THE INVENTION

Accordingly, the primary aim of the present invention is to provide methods and means for increasing the cost effectiveness of facsimile communications carried out with conventional installations of ordinary telephone sets. In keeping with that goal, a general object is to reduce the time and attention operators must devote to the operation of facsimile terminals which employ transducer type couplers for telephone interfacing purposes.

More particularly, an object of this invention is to provide a controller which is not only capable of automatically answering and disconnecting calls to and from telephone interfaced facsimile terminals but which is also compatible with standard installations of voice-type telephone sets. A related object is to provide a controller which may be easily and quickly enabled or disabled so that calls to and from such a facsimile terminal may be answered and disconnected automatically or manually as desired.

Another object of the present invention is to provide a controller which has sufficient versatility to be field modified by moderately skilled workers working with ordinary hand tools to match the diverse characteristics of different facsimile units.

A further object of this invention is to embody a controller having the aforementioned characteristics into an accessory which may be readily combined with existing, as well as new, facsimile terminals.

Finally, another of the more general objects of the present invention is to provide a relatively reliable, inexpensive, and easy to install controller of the foregoing type.

Briefly, to carry out these and other objects of the invention, a controller for automatically answering and disconnecting calls to and from telephone interfaced facsimile terminals without any direct electrical connections of the controller or the facsimile equipment to the associated telephone set has been provided. As here illustrated, the controller comprises an actuator arm for mechanically operating the cradle switch of the telephone set, a driver for the actuator arm, and a control circuit for activating the driver whenever there is an incoming call to be answered or an incoming or outgoing call to be disconnected. Advantageously, the actuator arm is selectively engageable with and disengageable from the driver so that the controller may be enabled or disabled depending on whether it is desired to handle the calls automatically or manually. When the actuator arm is engaged with the driver the controller is enabled since the driver then moves the actuator arm toward and away from the telephone cradle switch in response to control signals supplied by the control circuit. Specifically, the control circuit inductively detects any ringing voltage applied to the telephone set so that the drive is activated to move the actuator arm away from the cradle switch whenever there is an incoming call to be answered. Further, when the telephone set is "off hook," the control circuit monitors the operation of the facsimile equipment so that the driver is activated to move the actuator arm toward the cradle switch whenever the transmission or reception of the facsimile message has been completed and there is an incoming or outgoing call to be disconnected.

BRIEF DESCRIPTION OF THE DRAWINGS

Of course, even further objects and advantages of this invention will become apparent when the following detailed description is read in conjunction with the attached drawings, in which.

DETAILED DESCRIPTION OF THE ILLUSTRATED EMBODIMENTS

While the invention is described in some detail hereinafter with reference to certain illustrated embodiments, it is to be understood that there is no intent to limit it to those embodiments. On the contrary, the intention is to cover all modifications, alternatives, and equivalents falling within the spirit and scope of the invention as defined by the appended claims.

A. Environment and General Overview

Figure 1:
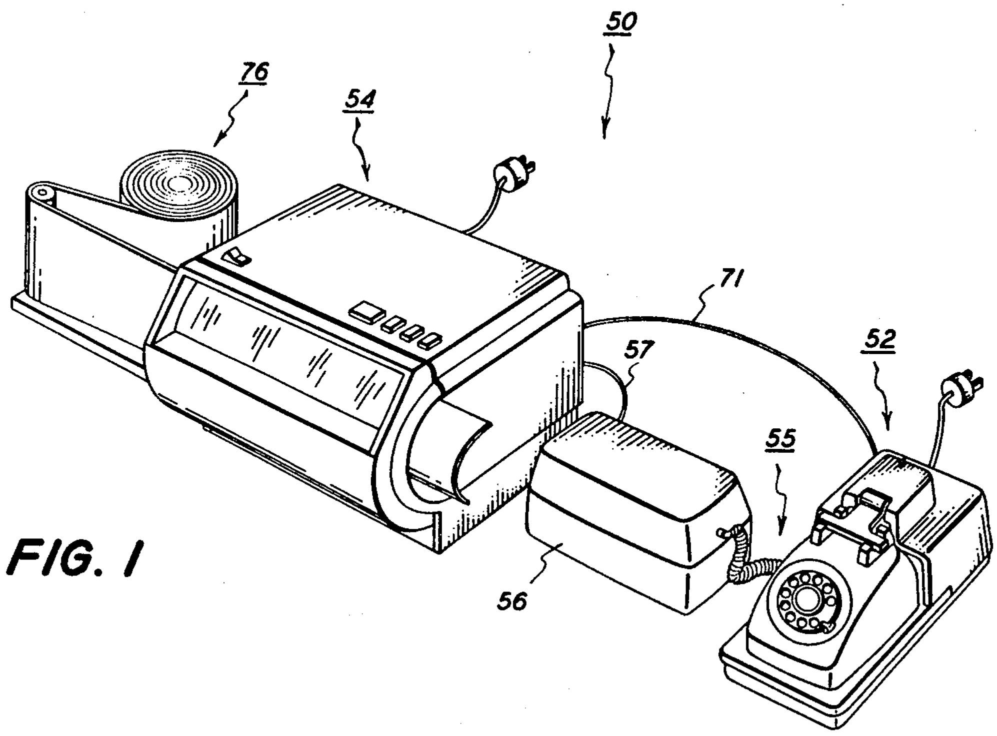
FIG. 1 is a simplified perspective view of a facsimile terminal equipped with a controller embodying the present invention.
Figure 2:
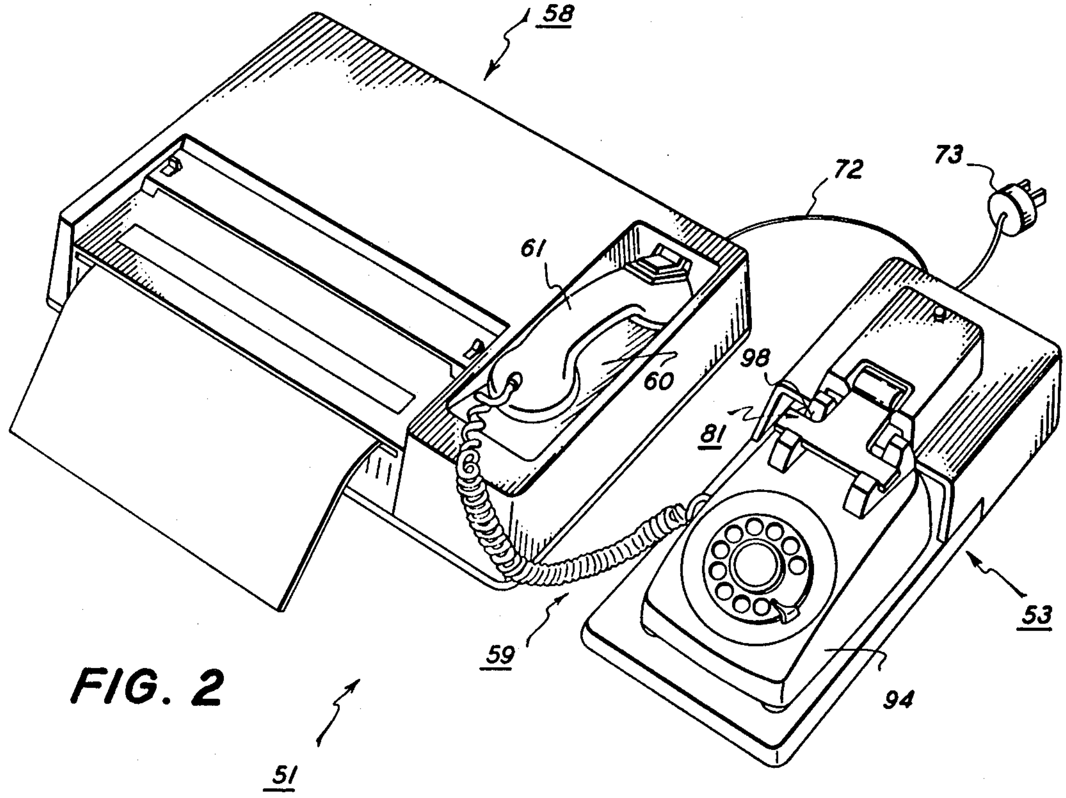
FIG. 2 is similar to FIG. 1, but illustrates a second embodiment of the controller which is suitable for use with a different type of facsimile unit.
Figure 4:
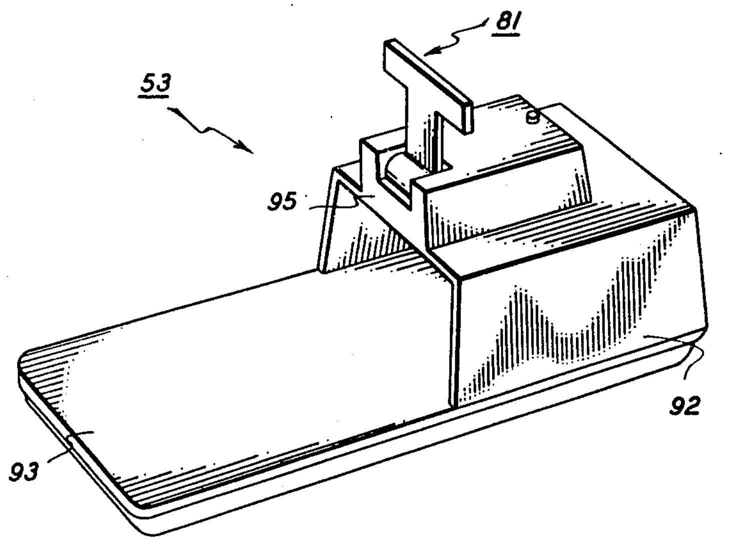
FIG. 4 is an enlarged fragmentary perspective view of a controller constructed in accordance with this invention and illustrates the mechanical details of the controller.

Turning now to the drawings, and at the outset especially to FIGS. 1 and 2, a couple of facsimile terminals, which are generally indicated at 50 and 51, have been selected to illustrate typical environments for controllers 52 and 53 constructed in accordance with this invention. Apart from the controllers 52 and 53, the facsimile terminals 50 and 51 are quite conventional. In fact, some readers may recognize that they are respectively representative of installations of commercially available Telecopier III and 400 Telecopier facsimile transceivers as manufactured by Xerox Corporation.

In the interest of conciseness, it will be assumed that the reader is at least generally familiar with the construction and operation of the Telecopier III and 400 Telecopier transceivers. The primary reasons for showing both of the terminals 50 and 51 are to highlight the versatility of the broader aspects of this invention and to provide a foundation for indicating the nature and scope of at least some of the variations that may be encountered in practice with controllers embodying the present invention but intended for use with different facsimile units. Of course, anyone desirous of detailed knowledge of the Telecopier III or the 400 Telecopier transceivers may inspect the commercially available units and review the published literature pertaining to those units.

For present purposes, it suffices to note that the first terminal 50 (FIG. 1) comprises a transceiver 54 which is interfaced with a telephone set 55 by an acoustic coupler 56. As is characteristic of a Telecopier III transceiver installation, the acoustic coupler 56 is spaced a short distance from the transceiver 54 and is electrically coupled thereto by an external cable 57. Similarly, the second terminal 51 (FIG. 2) also includes a transceiver 58 which is interfaced with a telephone set 59 by an acoustic coupler 60. In this case, however, the acoustic coupler 60 is built into the transceiver 58 in keeping with the usual configuration of the 400 Telecopier transceiver.

Acoustic couplers are, of course, well known transducer-type interfacing devices. It is therefore, unnecessary to describe either of the couplers 56 and 60 in detail. Likewise, the telephone sets 55 and 59 need not be described in detail, although it is perhaps appropriate to observe that they may typically be ordinary desk-type telephone extensions which are integraded (by means not shown) into more or less conventional telephone networks (also not shown).

In accordance with the present invention, the controllers 52 and 53 are capable of automatically answering and disconnecting calls to and from the facsimile terminals 50 and 51, respectively. These functions are carried out without any direct electrical connections of the telephone sets 55 and 59 to any of the other equipment comprised by the facsimile terminals. Instead, as best shown in FIG. 2 for the facsimile terminal 51, the telephone 59 is effectively coupled to the transceiver 58 by seating its handset 61 in the acoustic coupler 60. It will, therefore, be realized that the controllers 52 and 53 are compatible with conventional installations of ordinary telephone sets.

To simplfy matters it will be assumed that the telephone sets 55 and 59 are identical desk-type telephone extensions of standard configuration. Nevertheless, there still are significant differences between the controllers 52 and 53 because of the diverse characteristics of the transceivers 54 and 58. Generally stated, the rule which comes into play is that each of the controllers must be mateched to the physical and mechanical characteristics of its associated facsimile unit. The term "facsimile unit" is here intended to indicate that at least broader aspects of the invention are applicable to controllers for dedicated facsimile transmitters and receivers, as well as to controllers intended for use with transceivers, such as shown.

As will be seen, the controllers 52 and 53 monitor the operational status of their associated transceivers 54 and 58 by means of cable connections 71 and 72, respectively, thereby enabling each of the controllers to determine whether its associated transceiver is running or not. One of the differences between the controllers 52 and 53 is the manner in which they make the aforementioned determination. Specifically, to determine whether a Telecopier III transceiver is running or not, advantage is taken of a characteristic change in the motor control outputs of the transceiver since the 360 Hz. A.C. signals appearing at those outputs when the transceiver is running are replaced by D.C. signals when the transceiver is stopped. Thus, in the terminal 50 (FIG. 1) the cable 71 enables the controller 52 to monitor the motor control outputs (not shown) of the transceiver 54, and the controller 52 and the transceiver 54 have separate connectors of plugs 73 and 74, respectively, so that each of them has direct access to, say, the commercial power mains (also not shown). On the other hand, with a 400 Telecopier transceiver the simplest parameter to monitor to determine whether the transceiver is running or not is the current drawn by the transceiver. Hence, in the terminal 51 (FIG. 2), only the controller 53 has a plug 75 for accessing the A.C. power supply, with the result that the transceiver 58 must draw its operating current through the controller 53 via the cable 72.

Of course, other differences between the transceivers 54 and 58 have been taken into account. For example, it will be seen that special provision has been made in the controller 52 to permit the transceiver 54 to be used with either cut sheet or continuous web copy stock. It is, therefore, worth mentioning that there is a commercially available roll feed accessory, such as is indicated generally at 76 (FIG. 1), manufactured by Xerox Corporation for its Telecopier III transceiver.

Figure 3:
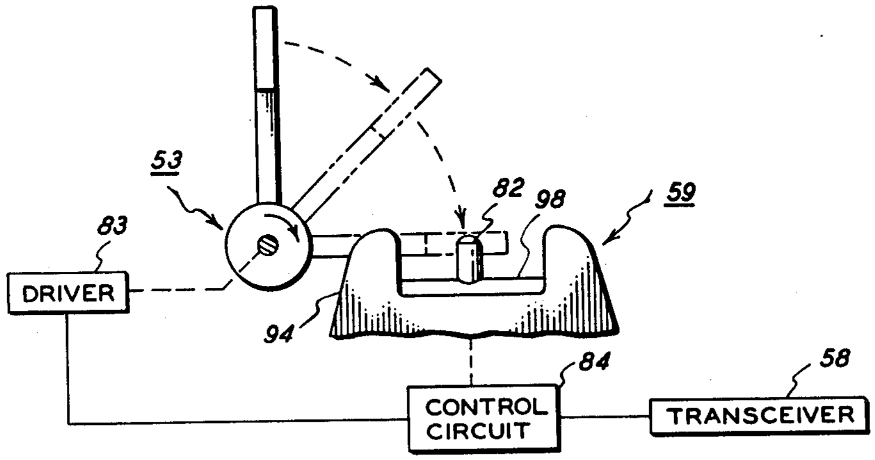
FIG. 3 is a simplified diagrammatic illustration of the controllers shown in FIGS. 1 and 2.
Figure 5:
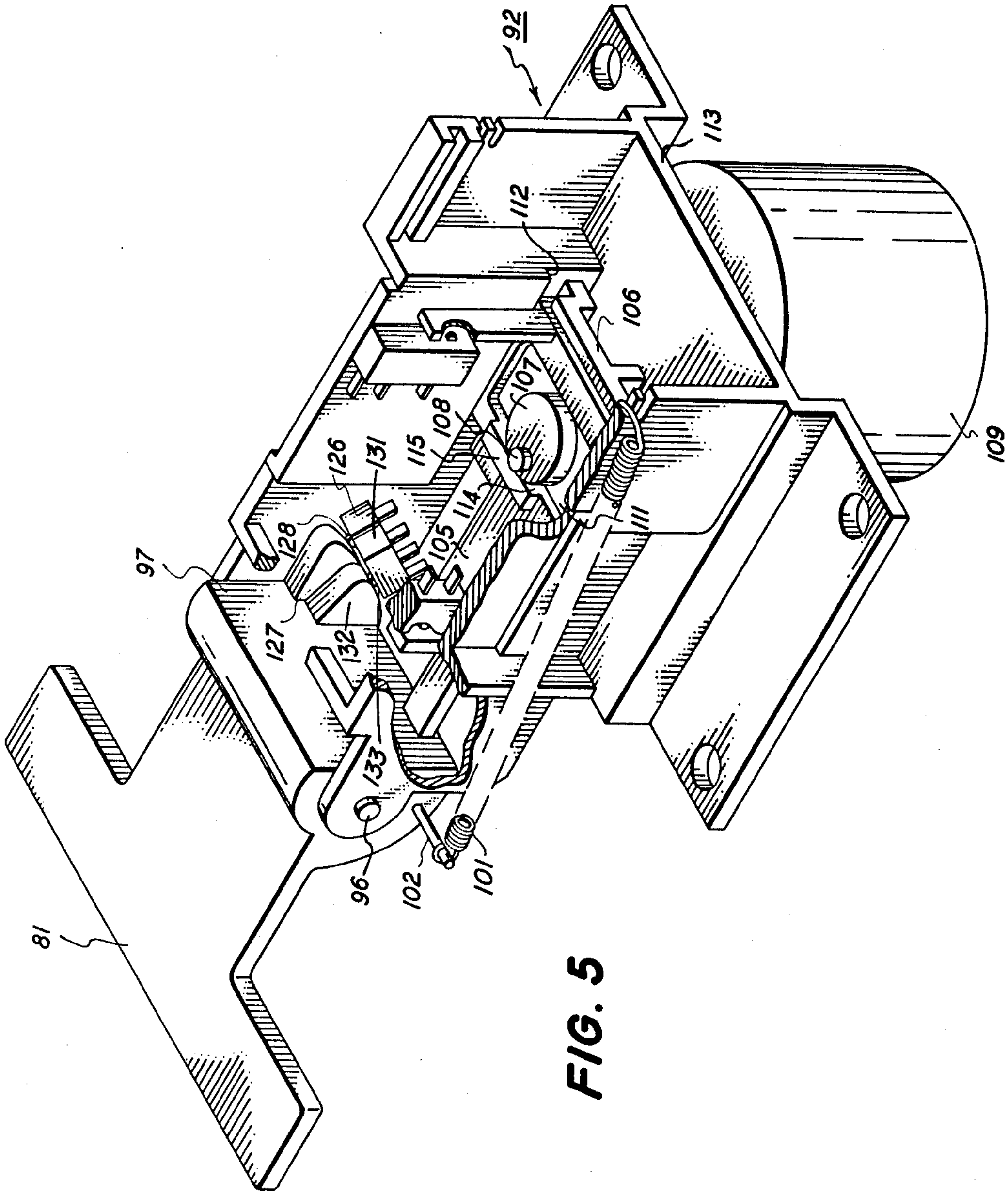
FIG. 5 is a simplified fragmentary side elevation of the controller shown in FIG. 3 as used with an ordinary desk-type telephone extension for telephonic facsimile communications and shows the relationship of the actuator arm to the telephone cradle switch in the various operating states of the controller.
Figure 6:
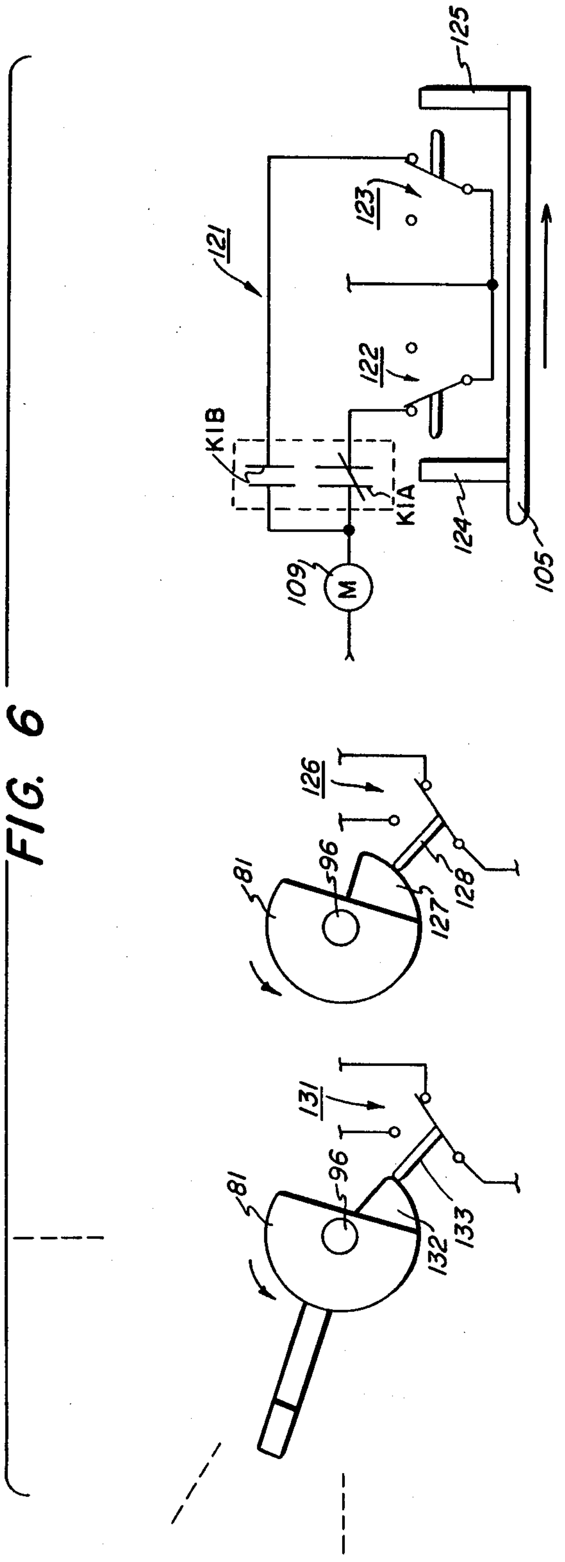
FIGS. 6–15 use a series of stop action diagrams illustrating the operation of the controller motor under various conditions.
Figure 7:
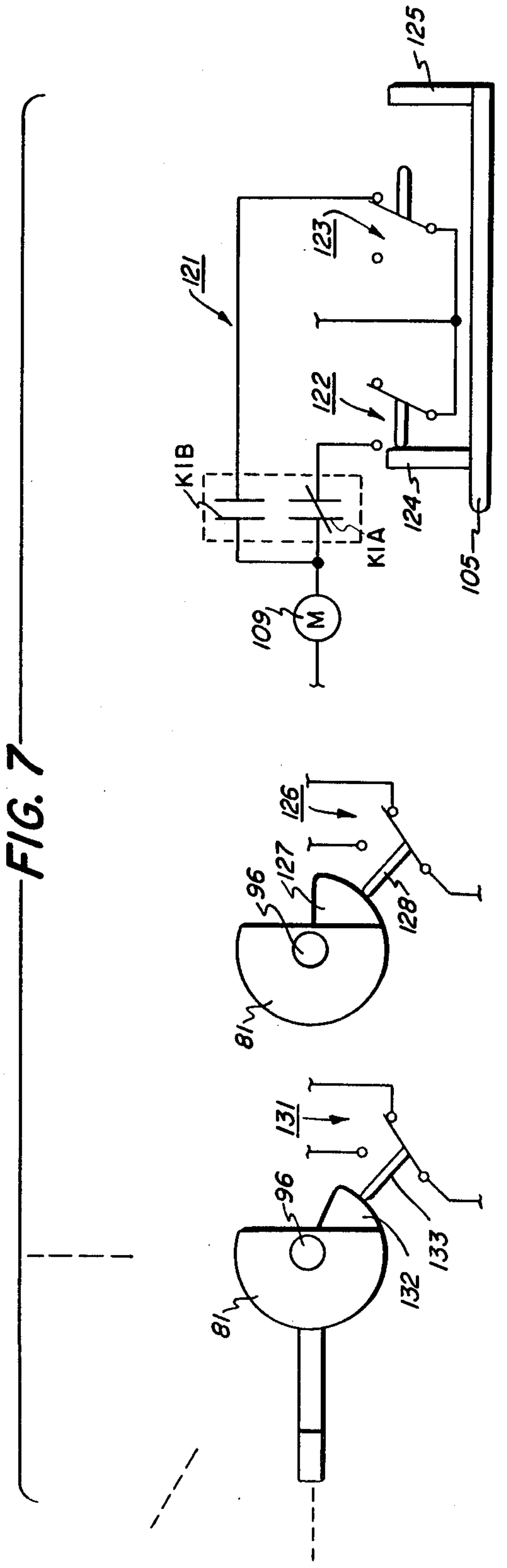
Figures 8, 9:
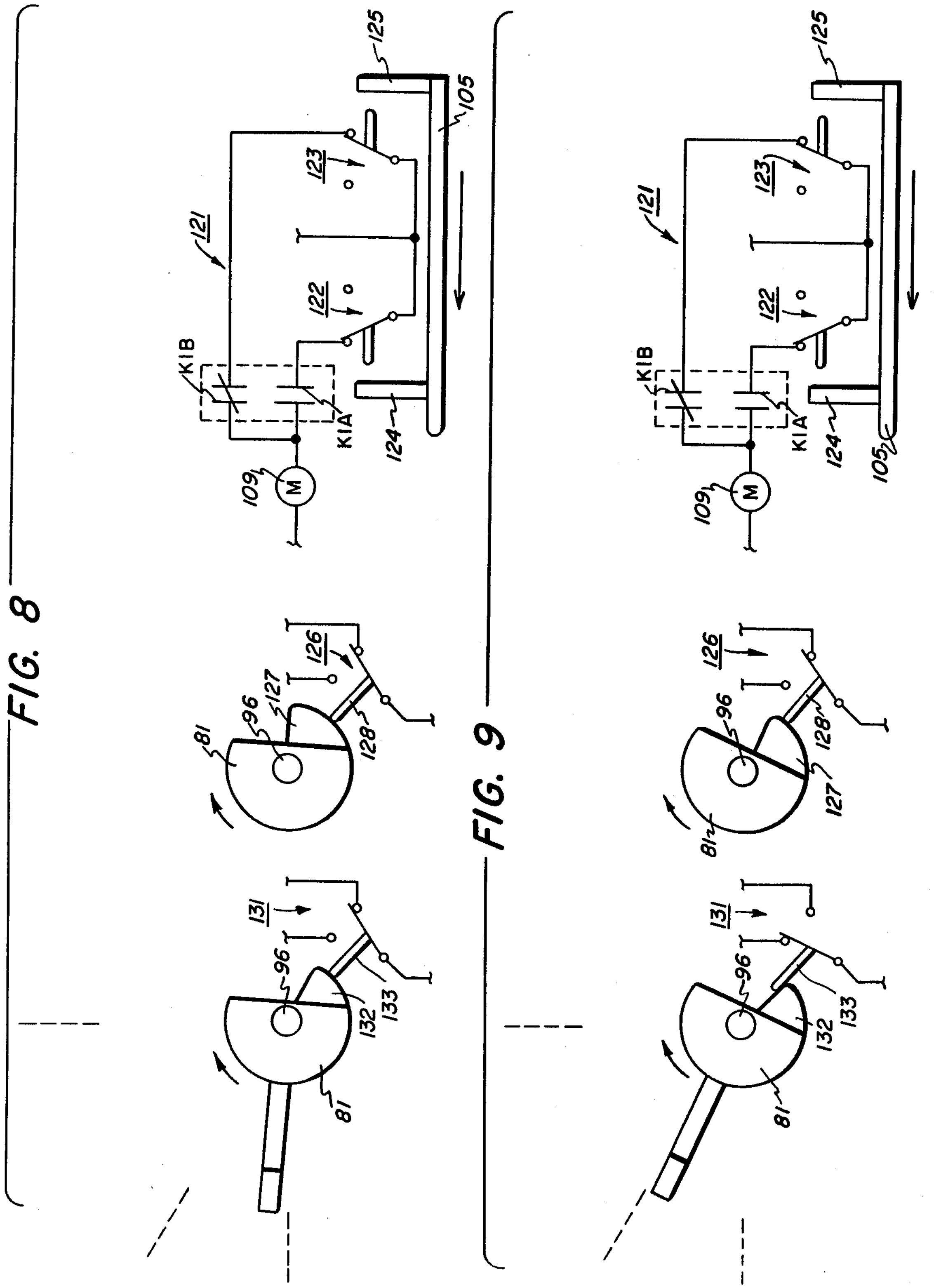
Figure 10:
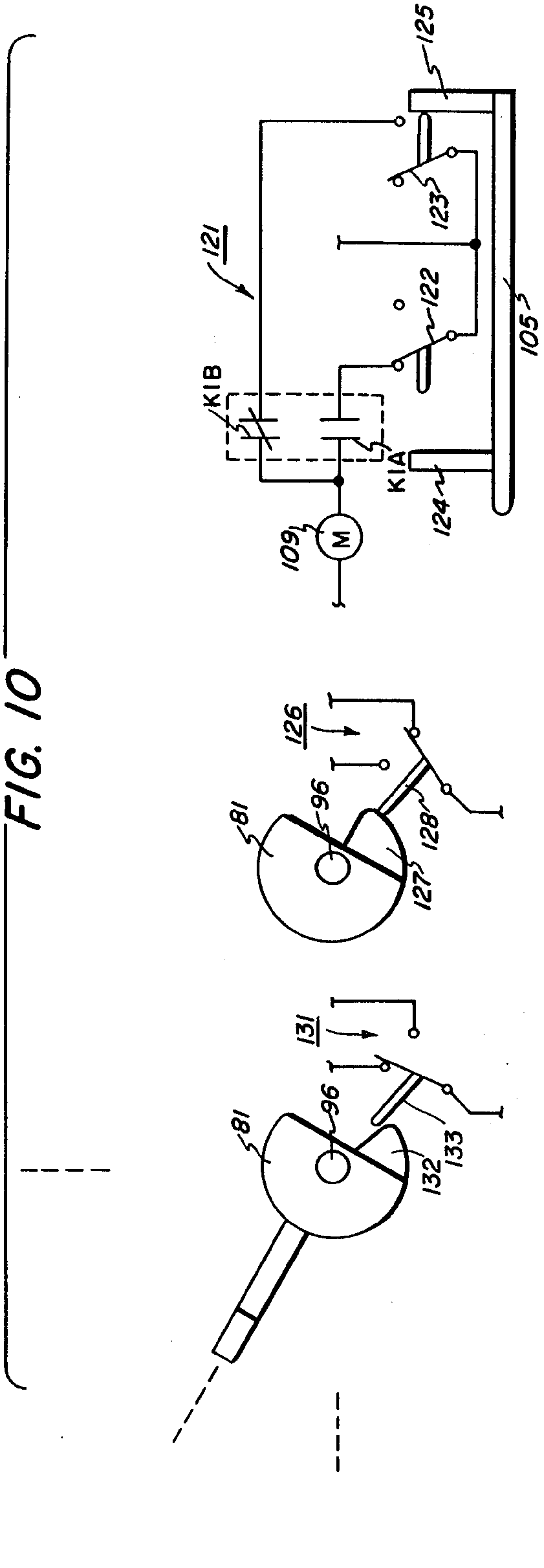
Figure 11:
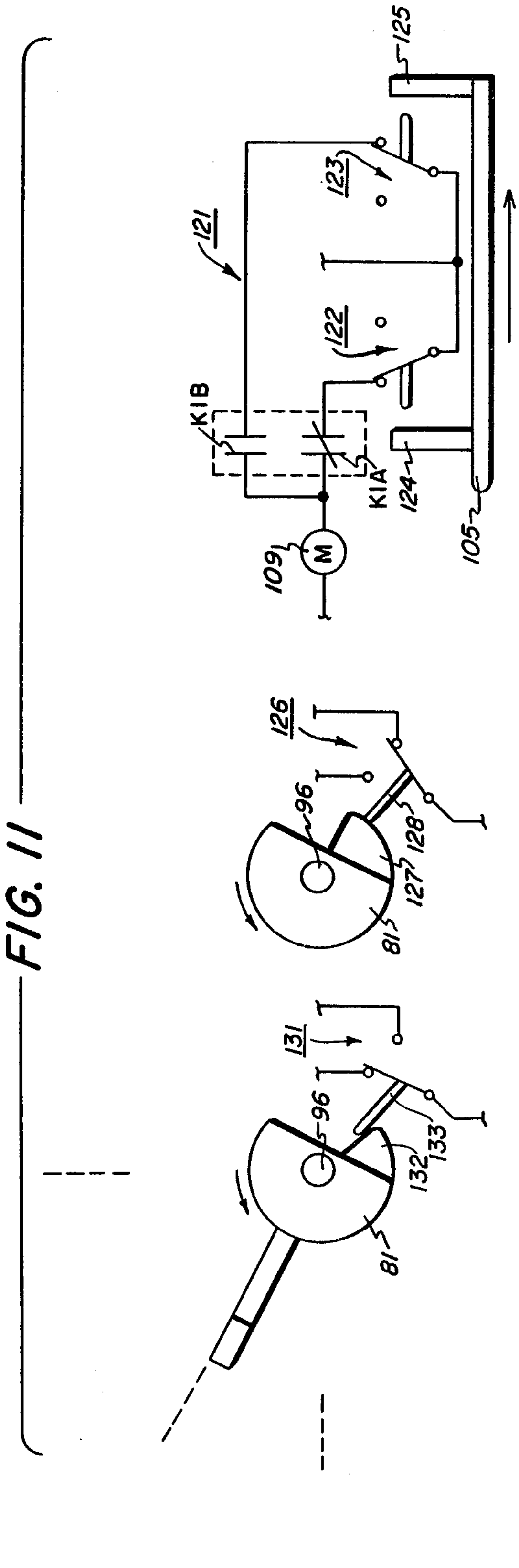
Figure 12:
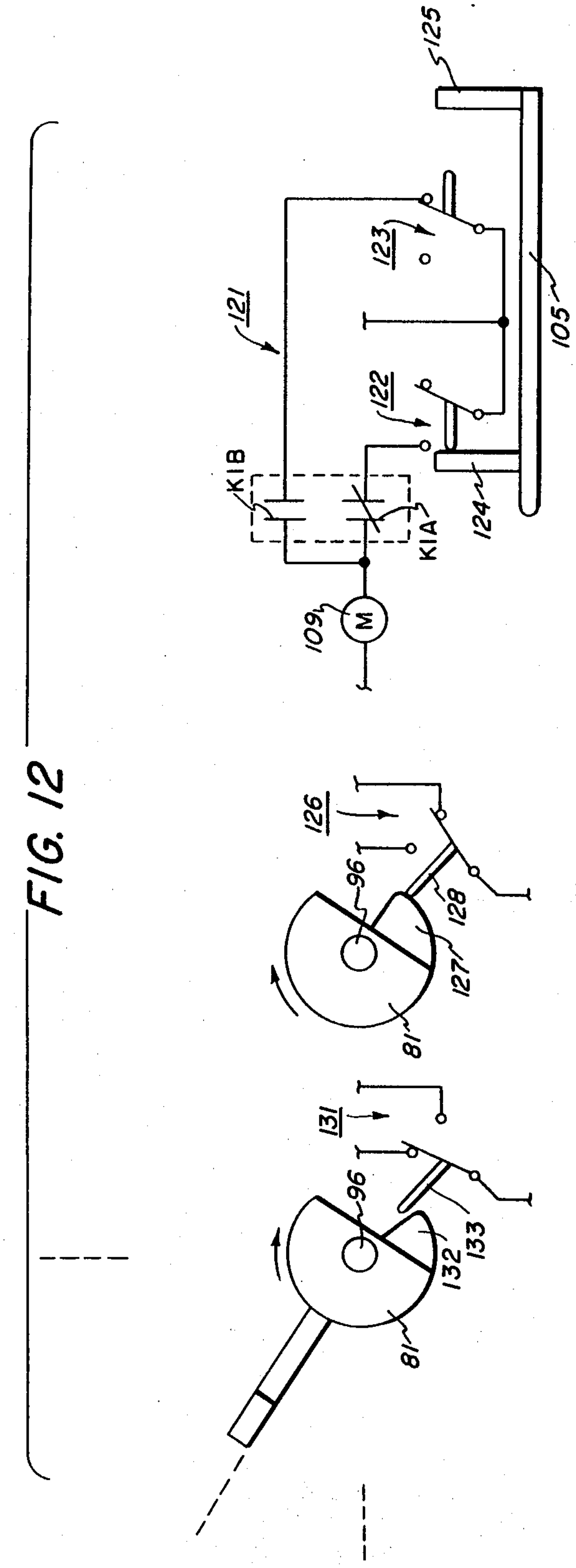
Figure 13:
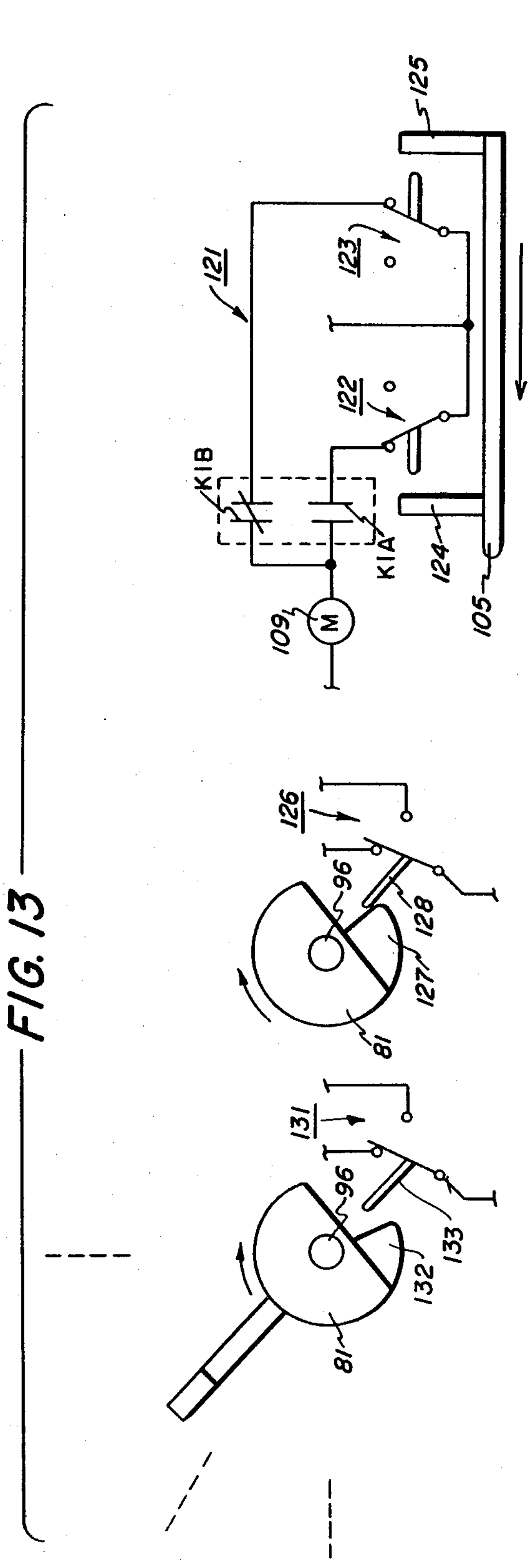
Figures 14, 15:
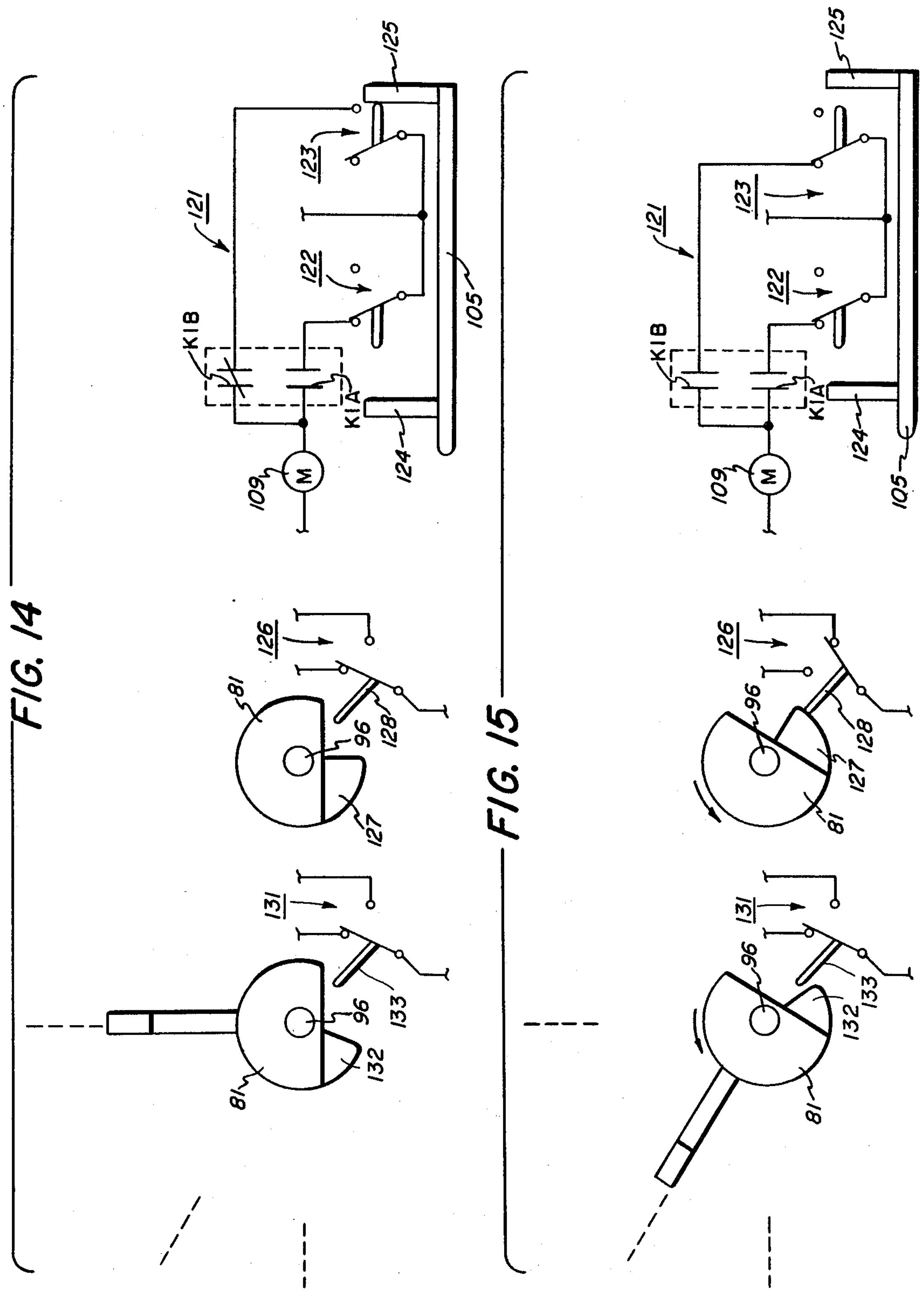

Still further differences between the controllers 52 and 53 will become evident. Such differences should not, however, be permitted to hide the fact that the controllers 52 and 53 are very similar when considered on a general level. Thus, as shown in FIG. 3 for the controller 53, it will be appreciated that the controllers 52 and 53 have the common characteristics of comprising an actuator arm 81 for mechanically operating the cradle switch 82 of the associated telephone set, a driver 83 for the actuator arm, and a control circuit 84 for activating the driver 83 whenever there is an incoming call to be answered or an incoming call or outgoing call to be disconnected. Further, the control circuit 84 of each controller inductively detects any ringing voltage applied to the associated telephone set to supply a first control signal for activating the driver 83 to move the actuator arm away from the telephone cradle switch 82 whenever there is an incoming call to be answered. And, the control circuit 84 of each controller also monitors the associated facsimile unit to supply another control signal for activating the driver 83 to move the actuator arm 81 toward the telephone cradle switch 82 upon the completion of each facsimile transmission or reception (i.e., whenever there is a call to be disconnected).

For additional clarity, separate sections hereof have been devoted to the descriptions of the mechanical, electromechanical, and electrical characteristics of the controllers 52 and 53. All of the sections are essential to a full understanding of the invention, but they may be referred to separately if specific features of one or both of the controllers are of special interest to the reader. The sections heading are, of course, merely intended to generally characterize the contents of the several sections.

B. Mechanical Features

As will be recalled, the simplifying assumption has been made that the telephone sets 55 and 59 are identical desk-type telephone extensions. Therefore, from a mechanical point of view, the controllers 52 and 53 are alike, with the result that it will be understood that the following detailed description of the mechanical characteristic of, say, the controller 53 applies equally as well to corresponding characteristics of the other controller 52.

Referring to FIGS. 2–5 with that in mind, it will be seen that the controller 53 has a step-like housing 91 for supporting the base 94 of the associated telephone set 59 with its cradle switch 82 in alignment with the actuator arm 81. The actuator arm 81 is pivotally mounted on the housing 91 and is capable of being swung toward and away from the telephone cradle switch 82 by the driver 83.

More particularly, in the illustrated embodiment, the housing 91 comprises a compartment 92 to accommodate the relatively bulky mechanical and electromechanical components of the controller and a hollow shelf-like member 93 for its more compact electronic components. The shelf 93 is secured to the lower edges of the compartment 92 and extends forwardly therefrom to provide a seat for the telephone base section 94. The inner end of the actuator arm 81 is fast on a substantially horizontal transverse shaft 96 which is journalled in the compartment 92 at approximately the same level that the cradle switch 82 is held when the telephone base section 94 is seated on the shelf 93.

Even relatively unskilled personnel can quickly and reliably align the telephone cradle switch 82 with the actuator arm 81. As illustrated, there is a cross bar 97 at the outer end of the actuator arm 81, and the length of the actuator arm 81 is selected so that the cross bar 97 and the cradle switch 82 are at approximately the same distance from the axis of the shaft 96 (i.e., the axis of rotation of the actuator arm 81) when the rear of the telephone base section 94 is abutted against the front face 95 of the compartment 92. Under nominal conditions, the telephone base section 94 is centered on the shelf 93 and has its rear firmly abutted against the front face 95 of the compartment 92. The slight deviations from these conditions that may incur in practice have, however, been anticipated. Specifically, the depth of the cross bar 97 (as measured longitudinally of the actuator arm 81) is selected to be somewhat less that the front-to-back span of the telephone cradle 98 so that slight gaps between the rear of the telephone base section 94 and the front face 95 of the compartment 92 can be tolerated, and the length of the cross bar 97 (as measured transversely of the actuator arm 81) is selected to be somewhat greater than the width of the telephone cradle 98 to accommdate situations in which the telephone base section 94 is mounted slightly off center on the shelf 93.

In accordance with one of the more detailed aspects of this invention, provision is made for selectively enabling and disabling the controller 53 so that calls to and from the associated facsimile terminal 51 can be answered and disconnected automatically or manually, as desired. As shown, a reciprocating motion provided by the driver 83 is relied on when the controller 53 is enabled to swing the actuator arm 81 toward and away from the telephone cradle switch 82. The actuator arm 81 is, in turn, selectively engagable with and disengagable from the driver 83. Specifically, the actuator arm 81 is supplied with a toggle type bias which is effective to urge an enlarged inner face 97 of the actuator arm 81 into or out of engagement with the driver 83 depending on whether the enabled or disabled state of the controller 53 has been selected. As will be appreciated, there is little, if any, risk with the illustrated arrangement that the actuator arm-cradle switch alignment will be upset as the controller 53 is enabled or disabled. Further, when the controller 53 is disabled, the actuator arm 81 is out of the immediate area of the telephone cradle 98 and, therefore, does not materially interfere with normal manual operation of the telephone set 59.

Suitably, the toggle-type bias for the actuator arm 81 is supplied by a pair of springs 101 (only one can be seen) which are connected between the controller housing 91 and the actuator arm 81 at opposite sides of the controller 53. The inner ends of the springs 101 are anchored to the controller housing 91 at substantially aligned anchor points, while their outer ends are anchored to respective ones of a pair of pins (again, only one can be seen) which are secured to and extend outwardly from the opposite sides of the actuator arm 81. To provide the toggle effect, the pins 102 are substantially horizontally aligned along an axis which is offset from the axis of rotation of the actuator arm 81. Accordingly, the bias supplied by the springs 101 is effective to urge the actuator arm 81 out of or into engagement with the driver 83 depending on whether the actuator arm 81 is oriented with the pins 102 above or below, respectively, the "dead center" position of the toggle which, of course, is defined by the plane that passes through the anchor points for the inner ends of the springs 101 and the axis of the shaft 96 (i.e., the axis of rotation of the actuator arm 81).

As shown, the driver 83 comprises a carriage 105 which is slideably mounted on a saddle 106, together with a circular cam 107 which is eccentrically mounted on the output shaft 108 of motor 109. The saddle 106 is secured to the opposite sidewalls of the compartment 92, and the cam 107 is seated within an aperture 111 formed in the carriage 105. Retaining shoulders 112 (only one can be seen) on the inner faces of the sidewalls of the compartment 92 overlie the opposite sides of the carriage 105 to constrain it against appreciable vertical movement. Suitably, the motor 109 is suspended from a mounting plate 113 fixed to the compartment 92 and its output shaft 108 extends to the cam 107 via vertically aligned passageways (not shown) through the plate 113 and the saddle 106.

As will be recalled, the driver 83 is activated whenever there is a call to be answered or disconnected and, therefore, some reciprocation of the carriage 105 may take place even when the controller 53 is disabled. For present purpose, however, it will be sufficient to concentrate on the enabled condition of the controller 53 since that is the condition in which the motion of the carriage 105 is relied on to swing the actuator arm 81 toward or away from the telephone cradle switch 82.

Specifically, when the controller 53 is enabled, the bias springs 101 urge the inner face 97 of the actuator arm 81 into engagement with the outer end of the carriage 105. The outer end of the carriage 105 is offset below the axis of rotation of the actuator arm 81 (i.e., the axis of the shaft 96), with the result that the actuator arm 81 swings upwardly and downwardly as the carriage 105 moves forwardly and rearwardly, respectively, on the saddle 106. The rearward thrust acting on the carriage 105 when the controller 53 is enabled maintains the forward sidewall 114 of the aperture 111 in firm contact with the adjacent edge of the cam 107. Now, as the cam 107 rotates, its effective radius (as measured between the point at which it contacts the forward sidewall 114 of the aperture 111 and the axis of rotation of the motor output shaft 108) changes, thereby causing the carriage 105 to move forwardly during one half of each revolution of the cam 107 and rearwardly during the other half of each revolution. The difference between the maximum and minimum effective radii of the cam 107, of course, determines the length of the stroke of the carriage 105. Therefore, it is selected together with the offset between the axis of rotation of the actuator arm 81 and the forward end of the carriage 105, to ensure that the actuator arm 81 is swung through an arc sufficient to cause the telephone set 59 to be OFF HOOK and ON HOOK when the carriage 105 is at the forward and rearward extremes, respectively, of its stroke. The aperture 111, on the other hand, is dimensioned so that only its forward sidewall 114 contacts the cam 107, and the forward sidewall 114 of the aperture 111 is desirably strengthened by a reinforcing rib 115 or the like.

C. Electromechanical Features

This and the next section of this disclosure should be read with the understanding that there is a close functional relationship between the electromechanical and the electrical characteristics of the controllers 52 and 53. Also, it should be noted that those characteristics of the controllers 52 and 53 have been matched on a case-by-case basis to the electrical characteristics of the exemplary transceivers 54 and 58, respectively. Those skilled in the art will, however, be able to extrapolate from this disclosure to the extent necessary to apply the teachings hereof to controllers for other types of facsimile units.

As will be seen, the original assumption that the transceivers 54 and 58 are Xerox Telecopier III and 400 Telecopier transceivers, respectively, leads tominor differences between the electromechanical characteristics of the controllers 52 and 53, at least from a functional viewpoint. It does not, however, impose inconsistent electromechanical requirements on the controllers. Indeed, in this instance, it is probably preferable to provide a single electromechanical assembly which is suitable for both of the controllers, even though the cost of doing that is that a few components are included to accommodate the controller 53, despite the fact that such components are functionally inactive in the controller 52. For that reason, the controller 53 will continue to be used as a generally representative example for this branch of the discussion. However, in the interest of completeness, attention will hereinafter be called to those components of the electromechanical assembly for the controller 53 which may be omitted, if desired, from the controller 52, without affecting its mode of operation or its performance.

Referring to FIGS. 5–15, it will be observed that provision has been made, in keeping with one of the important features of this invention, for keeping the controller 53 "in step" with the associated transceiver 58. To accomplish that the controller motor 109 is energized, regardless of whether the controller 53 is enabled or disabled to position the carriage 105 in (1) a substantially fully extended position at or near the forward end of its stroke at the outset of each transmission to or by the transceiver 58, and (2) a substantially fully retracted position at or near the rearward end of its stroke after the completion of each such transmission. Absolute synchronism is not practical for a couple of reasons. First, the initiation of a transmission may be marked either by the application of a ringing voltage to the telephone set 59 in the case of an incoming call or by the actual flow of information to or from the transceiver 58 in the case of an outgoing call. Secondly, there is desirably a short interval after the completion of each transmission during which the controller 53 "times out" to confirm that the transmission has, in fact, been concluded. Nevertheless, the position of the carriage 105 is generally consistent with the status of the transceiver 58, with the result that the controller 53 may be enabled whenever desired with little, if any, risk that it will prematurely cause the telephone set 59 to go OFF HOOK or ON HOOK. For example, a call may be placed from the telephone set 59 while the controller 53 is disabled to establish communications with another facsimile terminal, and then the operator may enable the controller 53. Thereafter, the operator is free to turn to other tasks because the controller 53 will automatically disconnect the call after the facsimile message has been transmitted to or received from the other terminal.

To carry out this aspect of the invention, the flow of energizing current for the motor 109 is controlled so that the motor is selectively energized and de-energized to keep the controller 53 "in step" with the transceiver. To that end, in the illustrated embodiment, the motor 109 is coupled to a suitable source, such as the commercial power mains, by a control circuit 121 comprising a pair of parallel connected relay controlled contacts K1A and K1B and a pair of limit switches 122 and 123. The limit switches 122 and 123 are connected in series with the contacts K1A and K1B, and the contacts K1A and K1B, are controlled by a relay K1 (FIG. 16), as described in more detail in the next section hereof, so that there are mutually exclusive paths for current flow to the motor 109. That is, the contacts K1A are closed only from the time that a transmission to or by the transceiver 58 is detected until the controller 53 times out to confirm that the transmission has been completed. Contraiwise, the contacts K1B are closed only from the time that the controller 53 times out until a transmission to or by the transceiver 58 is detected. The limit switches 122 and 123, on the other hand, are normally closed switches which are relied on to interrupt the current flow through the contacts K1A and K1B, respectively, so that the carriage 105 is brought to rest in its substantially fully extended position when there is a transmission to or by the transceiver 58 and in its substantially fully retracted position after the controller 53 has timed out. More particularly, there are trip arms 124 and 125 for opening the limit switches 122 and 123 as the carriage 105 approaches the forward and rearward ends, respectively, of its stroke. In this instance, the limit switches 122 and 123 are mounted in the compartment section 92 of the controller housing 91. The trip arms 124 and 125 are, therefore, mounted on the carriage 105, with the trip arm 124 positioned rearwardly of and in alignment with the limit switch 122 and the trip arm 125 positioned forwardly of and in alignment with the limit switch 123. Consequently, as the carriage 105 approaches the forward end of its stroke, the trip arm 124 engages an actuator **122*a* for the limit switch 122, thereby opening the switch 122 to de-energize the motor 109 so that the carriage 105 comes to rest in a substantially fully extended position. Similarly, as the carriage 105 approaches the rearward end of its stroke, the trip arm 125 is brought into engagement with an actuator 123*a* for the limit switch 123. Hence, the switch 123 is then opened, with the result that the motor 109 is de-energized thereby causing the carriage 105** to come to rest in a substantially fully retracted position.

In accordance with another of the detailed aspects of this invention, means are included in the controller 53 to provide a visual indication which may be reilied on when the controller 53 is in its automatic mode (i.e., enabled) to determine whether the transceiver 58 is ready to receive a message or not and whether the telephone set 59 is ON HOOK or OFF HOOK. The particular provision made for that purpose is more conveniently described in the next section of this disclosure. However, here it should be noted that there is a switch 126 which is closed when the controller 53 is enabled and open when the controller 53 is disabled. Suitably, the switch 126 is a normally open pressure sensitive switch which is mounted in the compartment section 92 of the controller housing 91 to be operated by an arcuate cam 127 carried on the inner face 97 of the actuator arm 81. As shown, the arcuate span of the cam 127 is selected so that the actuator 128 for the switch 126 is depressed when the controller 53 is enabled and released when the controller 53 is disabled.

As previously mentioned, the assumption that the transceiver 58 is a Xerox 400 Telecopier unit makes it desirable to have that unit draw its operating current through the controller 53. Advantage is taken of this characteristic in accordance with a more or less specialized feature of this invention to minimize the current drained by the transceiver 58 when it is not running. Specifically, to accomplish that there is a second pressure sensitive switch 131 mounted in the compartment section 92 of the controller housing 91 and another arcuate cam 132 mounted on the inner face 97 of the actuator arm 81 in position to operate an actuator 133 for the switch 131. As shown, the switch 131 is normally closed (i.e., it is closed when its actuator 133 is released). Accordingly, the arcuate span of the cam 132 is selected so that it engages the switch actuator 133 only when the actuator arm 81 is in or near its lower position (FIG. 4) so that the switch 131 is open only when the controller 53 is holding the telephone set 59 ON HOOK, or, in other words, only when the controller 53 can confirm that the transceiver 58 is not running.

In passing, it should be noted that the switch 131 and the cam 132 are functionally inactive when included in the controller 52 inasmuch as the transceiver 54 has separate access to the supply source. Neither of those components interfere with the operation of the controller 52, but they may be omitted, if desired, without affecting the mode of operation or the performance of that controller.

D. Electrical Features

As previously mentioned, the controllers 52 and 53 have been matched to the transceivers 54 and 58, respectively. This is accomplished without imposing any inconsistant electrical requirements on either of the controllers and, therefore, their characteristics may be combined to provide a single controller which is suitable for both of the transceivers 54 and 58. Indeed, as a practical matter, it may be preferable to have one controller which may be used with either of the transceivers. Nevertheless, in the interest of clarity, the electrical characteristics of the controllers 52 and 53 are separately considered in this section, but the drawings may be relied upon if it is desired to merge their electrical characteristics into a single controller inasmuch as identical components have been identified by like reference numerals and appropriate points for interconnecting the unique circuits of the two controllers 52 and 53 have been shown.

Figure 16A:
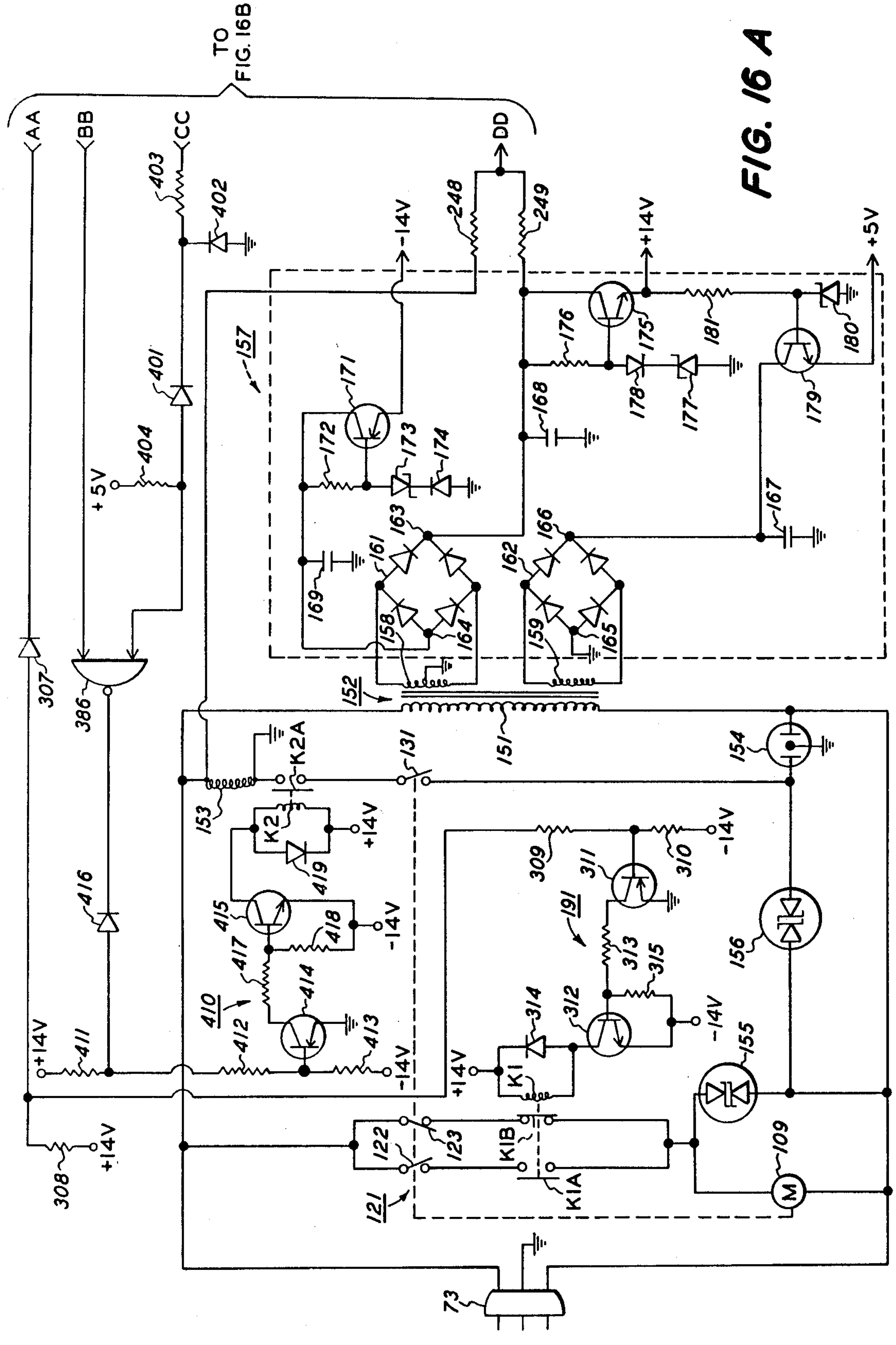
FIGS. 16A–16C combine to form a schematic diagram of a suitable control circuit for the controller shown in FIG. 2.
Figure 16B:
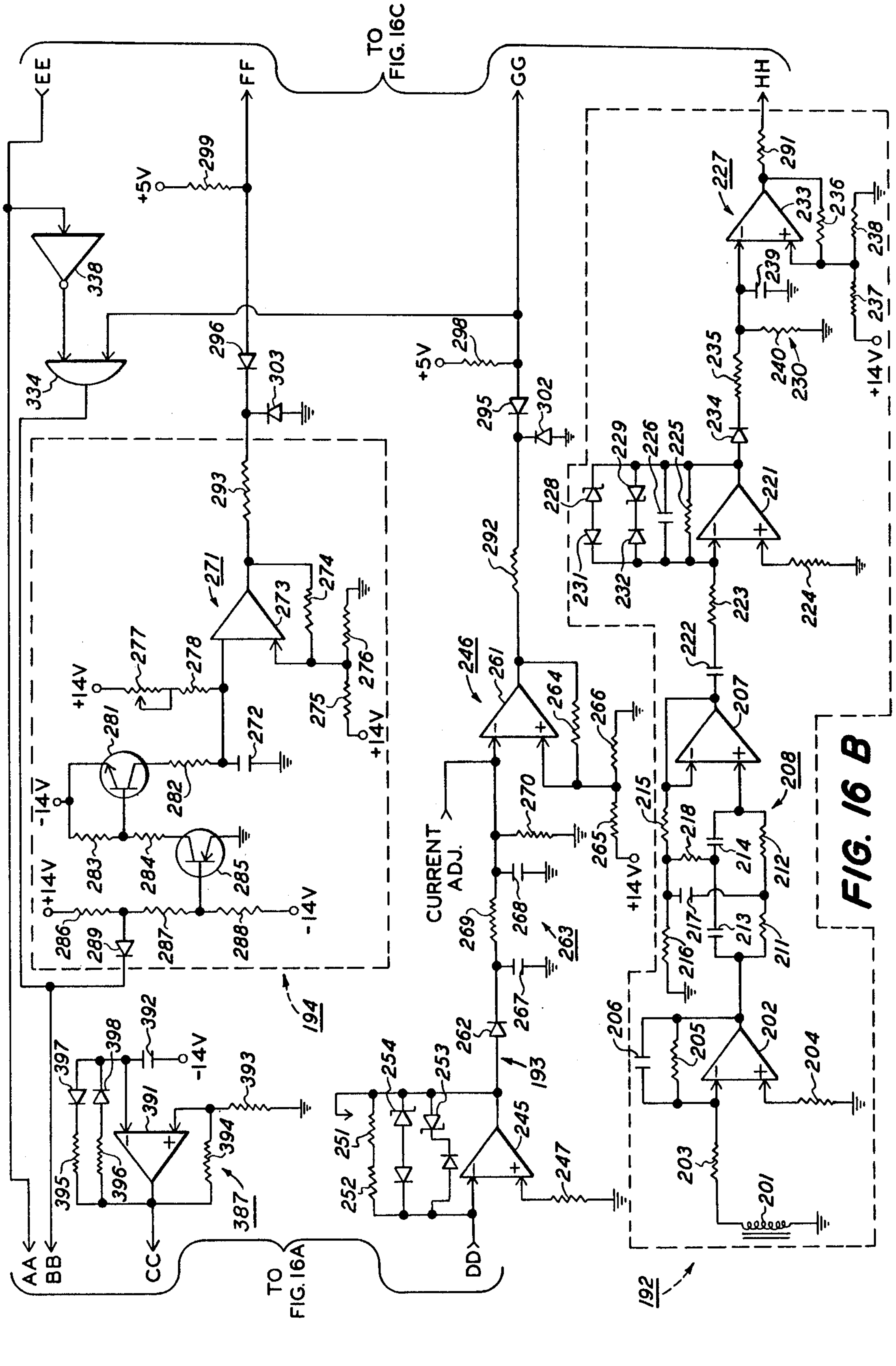
Figure 16C:
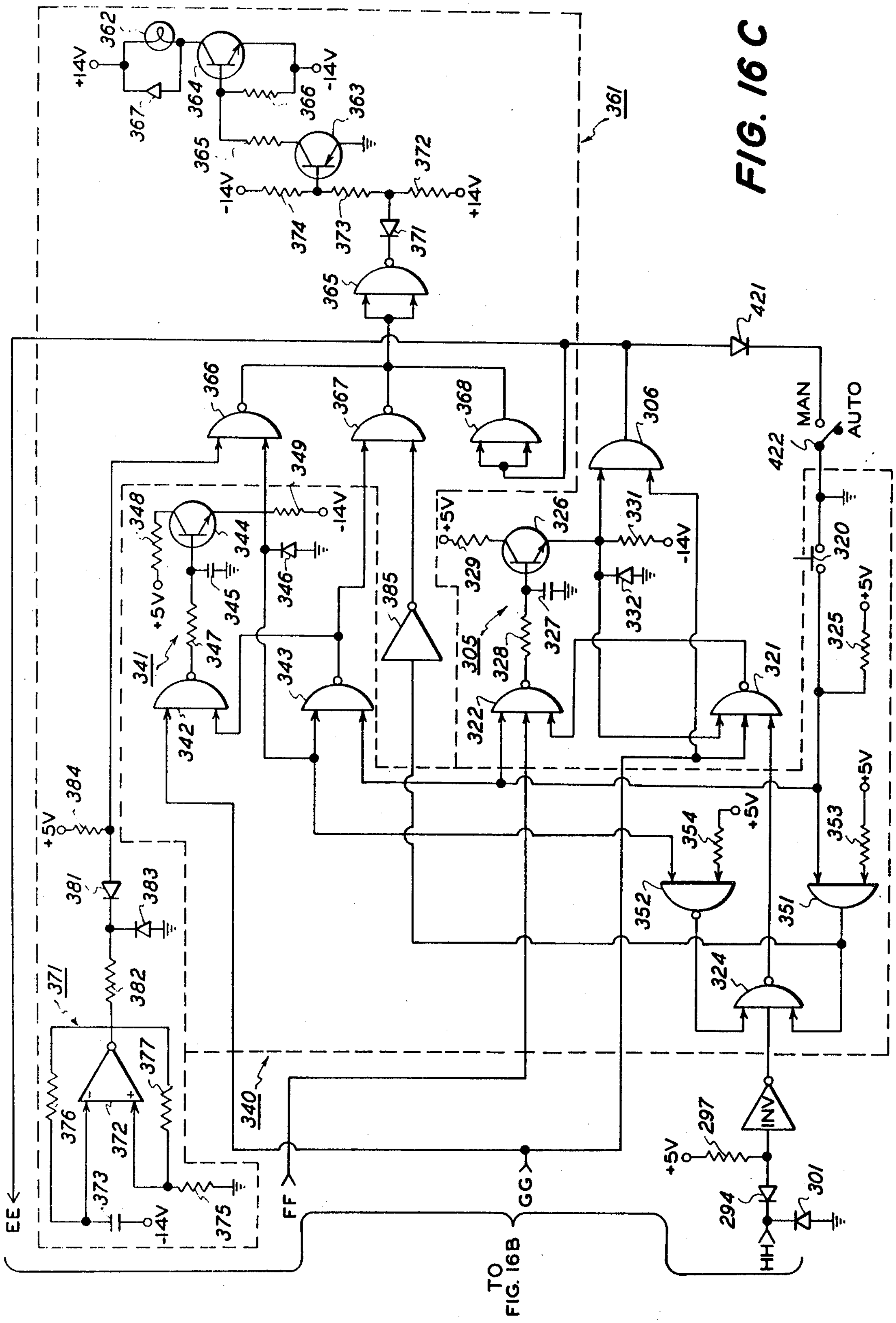
Figure 17A:
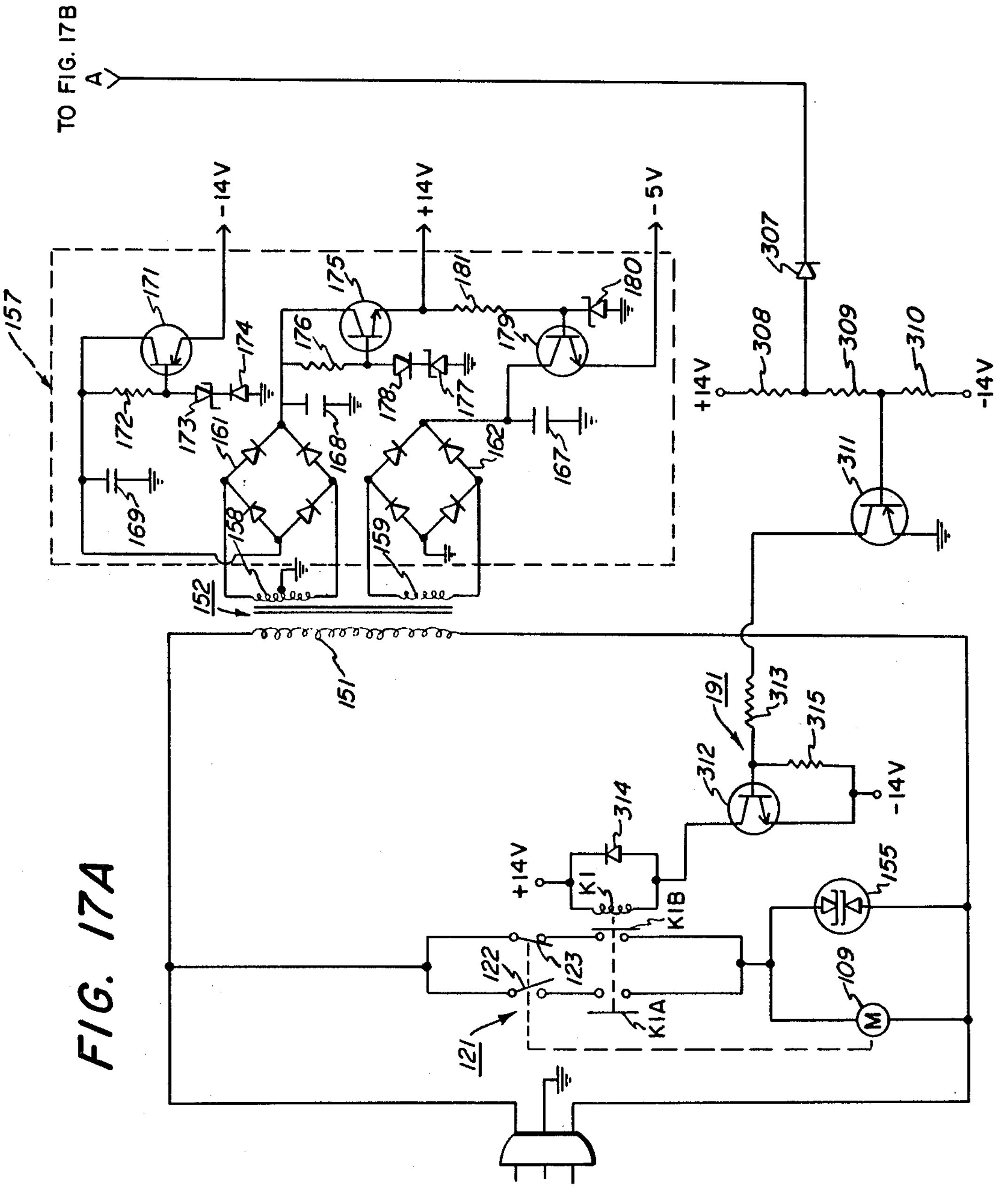
FIGS. 17A–17D combine to form a schematic diagram of a suitable control circuit for the controller shown in FIG. 1.
Figure 17B:
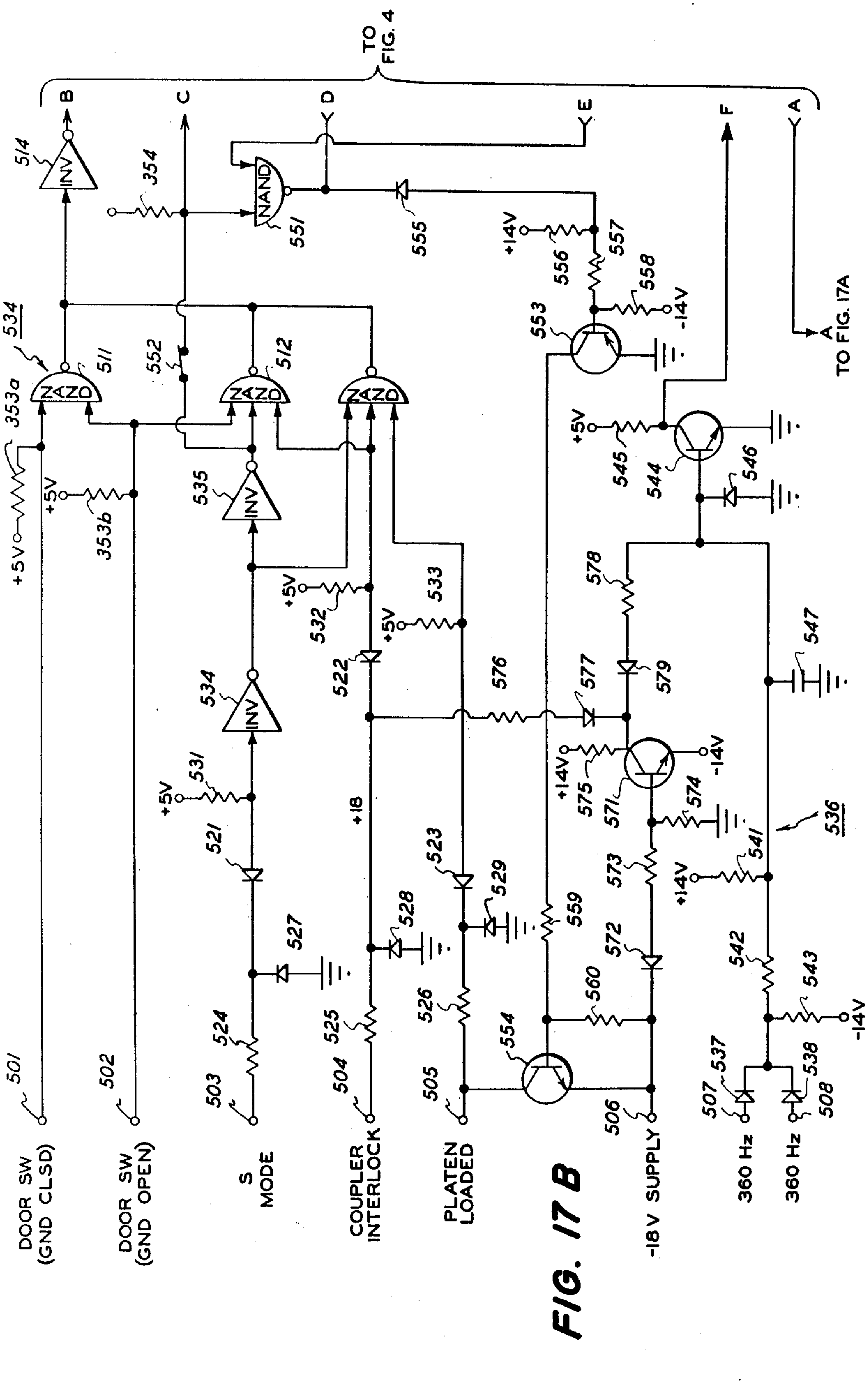
Figure 17C:
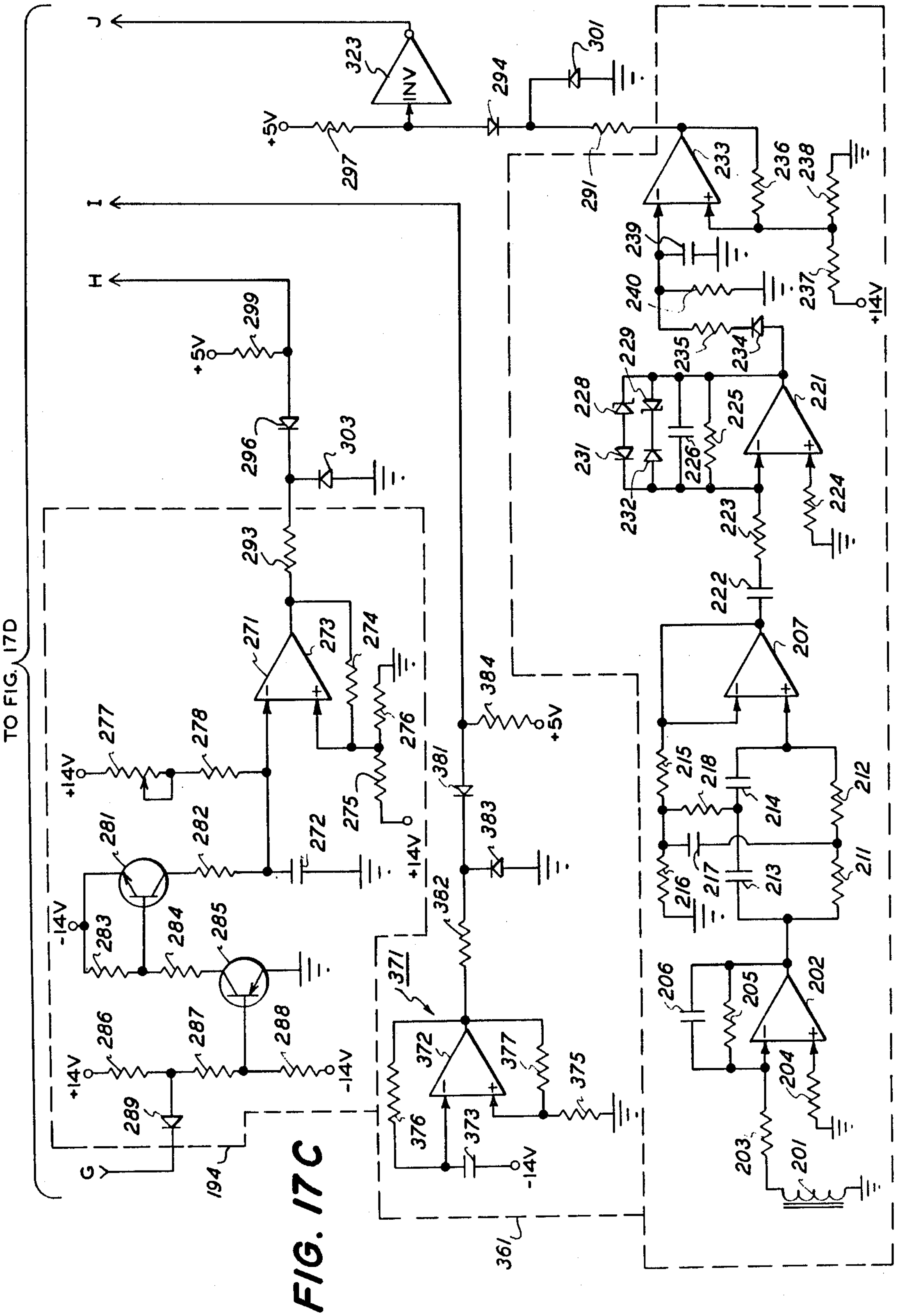
Figure 17D:
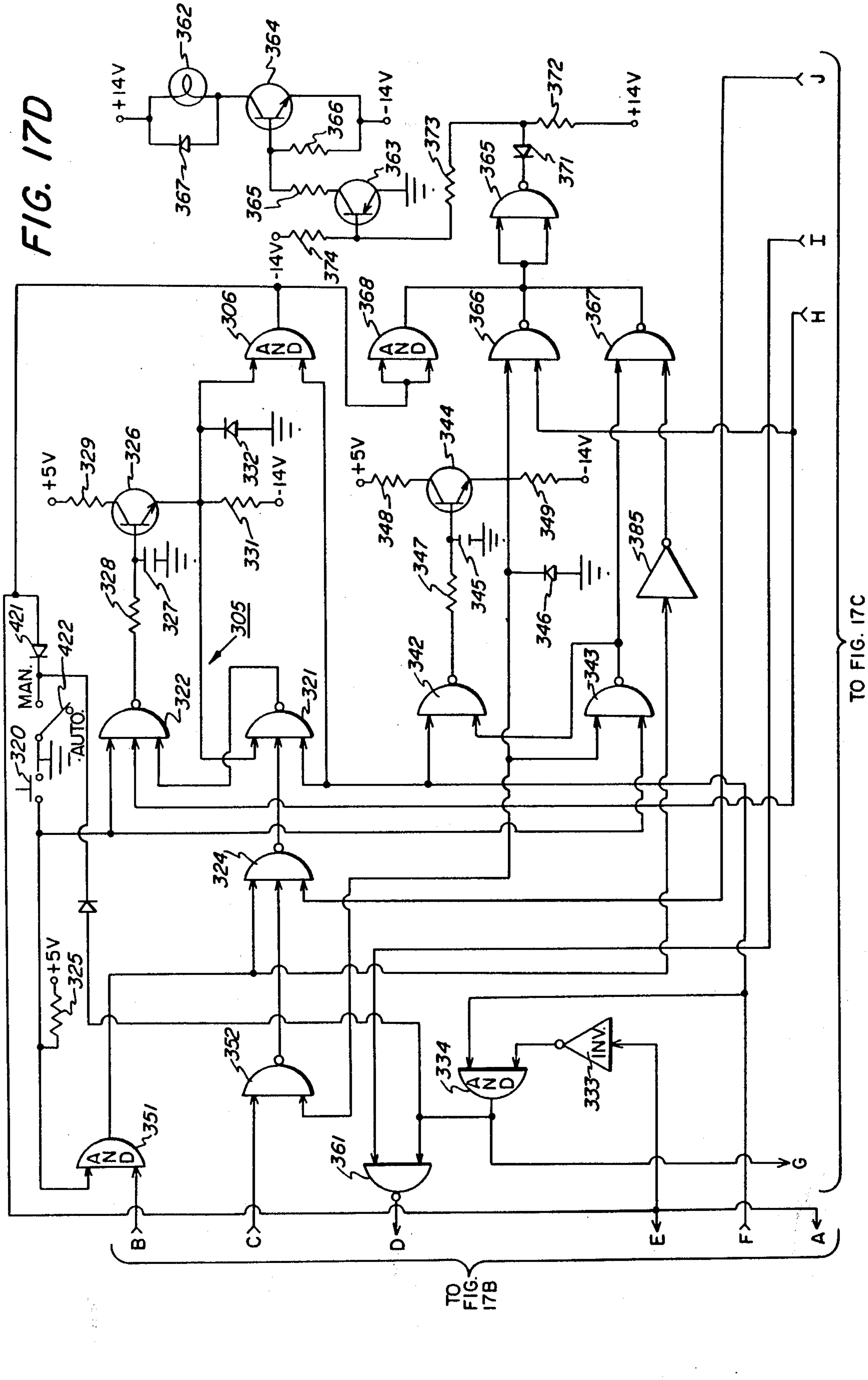

Referring first to the controller 53 and, more particularly to FIGS. 16–16C which illustrate the control circuit 84 of that controller, it will be seen that the plug 73 is connected across (1) the series combination of the motor 109 and the motor control circuit 121, (2) the primary winding 151 of a power transformer 152, and (3) the series combination of a current transformer 153, the contacts K2A of a relay K2, the switch 131, and an electrical outlet or jack 154. Those circuits are connected in parallel so that the terminal voltage of the AC source (say, the AC line voltage) appears across each of them when power is applied to the controller. There is the probability of rapid excursions in the voltage drops developed across the motor 109 and the jack 154 inasmuch as the circuits connecting them to the plug 73 are switched open and closed. Hence, in keeping with accepted practices, double anode zener diodes 155 and 156 or other suitable transient suppressors are connected in parallel with the motor 109 and the jack 154, respectively, to suppress the switching transients that tend to be generated.

A self-contained, regulated DC power supply 157 is employed to supply the various DC voltages needed for operation of the control circuit 84. Specifically, as shown, the power supply 157 provides a positive DC supply voltage (+14v.), a negative DC supply voltage (−14v.), and a positive DC logic voltage (+5v.). In the illustrated embodiment, the necessary DC voltages are provided in response to the AC voltage applied to the primary winding 151 of the transformer 152 by using AC to DC conversion followed by voltage regulation.

More particularly, in this instance, the transformer 152 has a pair of secondary windings 158 and 159, and the power supply 157 includes a corresponding pair of diode bridges 161 and 162. To perform the desired AC to DC conversion, the diagonally opposed input terminals of the bridges 161 and 162 are connected to the opposite ends of the secondary windings 158 and 159, respectively. Specifically, as shown, the secondary winding 158 has a center tap which is held at a suitable reference potential (illustrated and conveniently referred to hereinafter as "ground") so that the winding 158 and the bridge 161 effectively form a pair of oppositely poled full wave rectifiers. That is, the bridge 161 has separate paths for the positive DC current flow from its forwardly poled output terminal 163 and the negative DC current flow into its reversely poled, diagonally opposed output terminal 164, with both of those paths being returned to ground via the center tap of the secondary winding 158. The diode bridge 162, on the other hand, is a simple full wave rectifier which has its reversely poled output terminal 165 return to ground so that there is positive DC current flow from its diagonally opposed, forwardly poled output terminal 166. In keeping with standard practice, the ripple components of the DC currents appearing at the bridge output terminals 163, 164 and 166 are shunted to ground via respective smoothing capacitors 167–169.

Series voltage regulation is employed in the power supply 157 to insure that the DC voltages are adequately stabilized. For example, to provide a reasonably stable negative DC supply voltage, the reversely poled output terminal 164 of the bridge 161 is connected to the collector of a transistor 171 which, in turn, has its conductivity controlled so that the voltage at its emitter is held very close to a predetermined set point for the negative supply voltage. More particularly, the transistor 171 has its base connected to the bridge output terminal 164 by a current limiting resistor 172 and returned to ground through a reversely poled Zener diode 173 and a forwardly poled compensating diode 174. The Zener diode 173 is selected to have a reverse breakdown potential substantially equal to the set point level for the negative supply voltage, while the compensating diode 174 is selected so that its forward voltage drop tracks any changes in the forward voltage drop of the base-emitter junction of the transistor 171. Consequently, if the voltage at the emitter of the transistor 171 drifts from the set point level, the base emitter drive current for the transistor 171 is increased or decreased, depending on the direction of the drift, to increase or decrease the conductivity of the collector-emitter circuit of the transistor 171, thereby returning its emitter voltage toward the set point for the negative DC supply voltage. For instance, if the negative DC supply voltage drops below (i.e. becomes more negative than) its preselected set point, the base-emitter drive current for the transistor 171 is decreased. Hence, the conductivity of the collector-emitter circuit of the transistor 171 is reduced so that the voltage dropped thereacross is increased, thereby returning the voltage at the emitter of the transistor 171 toward the set point level.

An oppositely polarized, but otherwise identical, series voltage regulator is used in the power supply 157 to provide a stabilized positive DC supply voltage in response to the positive DC current flow at the forwardly poled output terminal 163 of the bridge 161. Thus, it will suffice to simply note that the positive DC supply voltage appears at the emitter of a NPN transistor 175 and that the voltage regulator for the positive supply voltage includes a current limiting resistor 176, a reversely poled Zener diode 177 and a forwardly poled compensating diode 178, in addition to the transistor 175. A somewhat different arrangement is, however, used to provide the positive DC logic voltage in response to the positive DC current flow appearing at the forwardly poled output terminal 166 of the bridge. Again, there is a NPN transistor 179 having it collector connected to the terminal 166 and its base returned to ground through a reversely poled Zener diode 180. The stabilized positive DC logic voltage appears at the emitter of the transistor 179, but the base-emitter drive current for the transistor 179 is drawn from the emitter of the transistor 175 via a current limiting resistor 181.

Considering the motor control circuit 121 in additional detail, it will be recalled that the limit switches 122 and 123 and the relay controlled contacts K1A and K2A provide alternative or mutually exclusive paths for energizing current for the motor 109 so that the carriage 105 (FIG. 5) is moved (1) to a substantially fully extended or OFF HOOK position at the outset of each transmission to or by the transceiver 58 and (2) to a substantially fully retracted or ON HOOK position after the completion of each such transmission has been confirmed. The relay controlled contacts K1A and K2A are alternately opened and closed so that the energizing current for the motor 109 is routed through the limit switch 122 once a transmission to or by the transceiver 58 is initiated and until the completion of the transmission is confirmed and through the limit switch 123 once the completion of the transmission is confirmed and until the next transmission is initiated. The limit switches 122 and 123, on the other hand, are normally closed switches which, as previously described, are open as the carriage 105 approaches its fully extended and fully retracted positions, respectively. In the illustrated embodiment, the contacts K1A and K1B are normally open and normally closed, respectively. Hence, the carriage 105 (FIG. 5) tends to move to its substantially fully extended or OFF HOOK position as the relay K1 is "pulled in" or energized and to its substantially fully retracted or "ON HOOK" position as the relay K1 is "dropped out" or de-energized.

To insure that the relay K1 is pulled in at the outset of each transmission to or by the transceiver 58 and dropped out after each such transmission has been completed, there is a driver 191 for energizing and de-energizing the relay K1 in response to changes in the logic level of a control signal applied to terminal AA. As will be seen, to appropriately time the changes in the logic level of the control signal with respect to anticipated or actual changes in the status of the transceiver 58, the control circuit 84 comprises a detector 192 for providing a ring detect signal in response to any ringing voltage applied to the telephone set 59, a monitor 193 for providing a message in progress signal whenever the transceiver 58 is running, and a timer 194 for providing a message complete signal whenever a predetermined "time out" period expires without the appearance of a message in progress signal.

It may be helpful to briefly consider the interrelationship between the control signal and the ring detect, message in progress and message complete signals before taking up the further details of the control circuit 84. Thus, starting sometime after quiescent conditions have been established, and while the transceiver 58 is idle, it will be seen that the control signal is then at a first logic level (in this case a high or 1 level) so that the relay K1 is de-energized to maintain the carriage 105 in its ON HOOK position. At that point, a transmission to or by the transceiver 58 may be remotely or locally initiated. First, in the case of a remotely initiated transmission, a ringing voltage is applied to the telephone set 59 and, therefore, the detector 192 provides a ring detect signal to mark the outset of the transmission. The ring detect signal causes the control signal to go to a second or low 0 logic level so that the relay K1 is pulled in, thereby causing the carriage 105 to move to its OFF HOOK position, with the result that the incoming call is automatically answered if the controller is enabled. At substantially the same time, the ring detect signal actuates the timer 194 so that a time out period starts to run. If the predetermined time out period expires without facsimile communications having being established with the transceiver 58, the timer 194 provides a message complete signal so that the control signal reverts to its original high 1 logic level, thereby dropping out the relay K1 to cause the carriage 105 to return to its ON HOOK position. If, on the other hand, the transceiver 58 starts to run before the time out period expires, a message in progress signal is provided by the monitor 193. The message in progress signal resets the timer 194 and holds the control signal at the second or low 0 logic level. Thus, still another time out period begins to run whenever the message in progress signal is interrupted so that the completion of the transmission to or by the transceiver 58 is effectively confirmed before a message complete signal is provided by the timer 194. Finally, when the message complete signal is provided, the control signal returns to its first or high 1 logic level, thereby dropping out the relay K1 to cause the carriage 105 to move to its ON HOOK position. Of course, if the controller is enabled, it will automatically disconnect a call as the carriage 105 moves to its ON HOOK position.

As will be appreciated, the ring detect signal initiates the above described sequence when there is a remotely initiated transmission to or by the transceiver 58. But, when there is a locally initiated transmission, the sequence is foreshortened since the control signal does not go to its second or low 0 logic level until a message in progress signal is provided. Hence, in the case of a locally initiated transmission, the relay K1 is pulled in to cause the carriage 105 to move to its OFF HOOK position only after the transceiver 58 starts running.

In keeping with the aim of avoiding direct connections to the telephone equipment, the ringing voltage detector 192 comprises a pick-up coil 201 which is positioned in the shelf-like member 93 of the controller housing 91 (FIG. 4) directly below the expected location of the telephone ringer coils (not shown) assuming that the telephone base section 94 will be mounted in its previously described nominal position on the housing 91. To distinguish the signals that are induced into the coil 201 by a ringing voltage from spurious signals, narrow band filtering and threshold detection are employed to take advantage of the characteristically narrow frequency range (30–50 Hz.) of ringing voltages and of the relatively effective inductive coupling of the pick-up coil 201 to the telephone ringer coils.

More particularly, as shown, the signals induced into the pick-up coil 201 are applied to the inverting input of an operational amplifier 202 via an input resistor 203. The non-inverting input of the operational amplifier 202 is returned to ground through a drift stabilizing resistor 204, while a resistor 205 and a capacitor 206 are connected in parallel between its output and its inverting input terminals. Hence, the operational amplifier 202 has a relatively sharp high frequency roll-off characteristic, with the result that it tends to accentuate the lower frequency signals induced into the pick-up coil 201. The signals passed by the operational 202 are next applied to an operational amplifier 207 through a parallel or twin-T network 208. The twin-T network 208 and the operational amplifier 207 cooperate to form a narrow band filter having relatively sharp roll-off or cut-off characteristics above and below the nominal frequency range (30–50 Hz.) for telephone ringing voltages. To that end, the twin-T network 208 comprises two legs which are connected in parallel between the output of the operational amplifier 202 and the non-inverting input of the operational amplifier 203, with one of the legs containing a pair of resistors 211 and 212 and the other containing a pair of capacitors 213 and 214. The output of the operational amplifier 207 is connected to its inverting input which, in turn, is returned to ground through a pair of resistors 215 and 216. Finally, to provide the high frequency filtering, there is a capacitor 217 which has one side connected to the junction intermediate the resistors 211 and 212 and its opposite side connected to the junction intermediate the resistors 215 and 216. Similarly, to provide the low frequency filtering, there is a resistor 218 which has one end connected to the junction intermediate the capacitors 213 and 214 and its other end connected to the junction intermediate the resistors 215 and 216.

As will be appreciated, the signals passed by the operational amplifier 207 are substantially free of all frequency components outside the nominal frequency range of the telephone ringing voltage, with the possible exception of signals at frequencies just above and just below the upper and lower limits, respectively, of that frequency range. Nevertheless, further filtering is provided to minimize, if not eliminate, all spurious signals at frequencies outside that frequency range. Specifically, the signals appearing at the output of the operational amplifier 207 are applied to the inverting input of an operational amplifier 221 via a coupling capacitor 222 and an input resistor 223. Of course, the coupling capacitor 222 tends to block any low frequency spurious signals. The operational amplifier 221 has its non-inverting input returned to ground through a drift stabilizing resistor 224 and like the operational amplifier 202, has a resistor 225 and a capacitor 226 connected in parallel between its output and its inverting input so that it has a relatively sharp high frequency roll-off characteristic.

A couple of observations may be made at this point. First, when a ringing voltage is applied to the telephone set 59, an AC signal, having the frequency of the ringing voltage is provided at the output of the operational amplifier 221. Secondly, any signal of appreciable amplitude appearing at the output of the operational amplifier 221 are within, or at least very close to, the nominal frequency range of the telephone ringing voltage. It may not, however, be assumed that all such signals were originally induced into the pick-up coil 201 in response to a ringing voltage inasmuch as there may be "inband" spurious signals (i.e., unwanted noise within the nominal frequency range for the ringing voltage. Thus, to discriminate such in-band noise energy from ringing voltage induced signals, the AC signals appearing at the output of the operational amplifier 221 are applied to a threshold detector 227 which provides a ring detect signal only if the average amplitude of the output signal from the operational amplifier 221 exceeds a predetermined threshold level. Of course, the threshold level is selected to be well below the usual amplitude of the output signal provided by the operational amplifier 221 in response to the application of a ringing voltage to the telephone set 59. Consequently, the output voltage swing of the operational amplifier 221 may be limited to reduce the risk of overdriving the threshold detector 227. To that end, as shown, there are a pair of oppositely poled Zener diodes 228 and 229 connected in parallel between the output and the inverting input terminals of the operational amplifier 221, together with a pair of blocking diodes 231 and 232 which are connected in series with the Zener diodes 228 and 229, respectively, and oppositely poled with respect thereto to prevent forward conduction thereof.

In the illustrated embodiment, the threshold detector 227 comprises an operational amplifier 233 having its inverting input coupled to the output of the operational amplifier 221 by a forwardly poled diode 234 and an averaging circuit 230, its output coupled to its non-inverting input by a feedback resistor 236, and its non-inverting input coupled to the junction between a pair of resistors 237 and 238. As shown, the resistors 237 and 238 are connected across the positive supply source. For that reason, the regenerative feedback provided by the resistor 236 causes the output of the operational amplifier 233 to be held at a positive saturation level or a negative saturation level depending on whether the threshold level established by the values selected for the resistors 236-238 is above or below the voltage appearing at the inverting input of the operational amplifier 233. As will be observed, the diode 234 passes the positive swings of the output signal of the operational amplifier 221 and, therefore, a DC signal which closely follows or tracks any variations in the average amplitude of such swings is applied to the inverting input of the operational amplifier 233 by the averaging circuit 230. To carry out its function, the averaging circuit 230 suitably includes a capacitor 239 connected in shunt with the inverting input of the operational amplifier 233, a resistor 235 connected in series with the diode 234 to provide a charging path for the capacitor 289, and a resistor 240 connected in parallel with the capacitor 239 to provide a discharging path. In that event, the charging and discharging time constants for the capacitor 239 are selected, together with the threshold level for the threshold detector 227, so that the voltage developed across the capacitor 239 generally exceeds the threshold level only when a ringing voltage is applied to the telephone set 59. Accordingly, in the absence of a ringing voltage, the output of the operational amplifier 233 is held at a positive saturation level. But, in the presence of a ringing voltage, a ring detect signal is provided since the output of the operational amplifier 233 then switches to its negative saturation level. The total delay between the application of a ringing voltage to the telephone set 59 and the appearance of a ring detect signal seldom exceeds the period of the telephone ringing voltage. Specifically, the delay is almost entirely attributable to the charging time constant for the capacitor 239, which is typically selected so that roughly one cycle of ringing voltage is ample to cause the appearance of a ring detect signal.

Turning now to the monitor 193, it will be recalled that the original assumption was that the transceiver 58 is a Xerox 400 Telecopier unit and that the jack 154 was included in the controller 53 to enable the transceiver 58 to draw the current it requires through the controller 53. The current transformer 153 has its primary winding coupled in series with the jack 154 so that advantage may be taken of the fact that the transceiver 58 draws substantially more current when it is running than when it is idle. The monitor 193 further includes an operational amplifier 245 for scanning the AC signal induced into the current transformer 153 with a DC level, and a threshold detector 246 for providing the message in progress signal applied to terminal GG when the AC swings of the sum signal consistently exceed a predetermined threshold level.

As shown, the operational amplifier 245 has its inverting input coupled to a summing node at the junction of a pair of summing resistors 248 and 249 and its non-inverting input returned to ground through a drift stabilizing resistor 247. The first summing resistor 248 is connected in series with the output of the current transformer 153 and the second summing resistor 249 is connected to the forwardly poled output terminal 163 of the bridge 161. Typically, the values of the summing resistors 248 and 249 are selected so that substantially more weight is given to the AC signal drawn through the resistor 248 than to the DC level provided by the summing resistor 249 to thereby accentuate the AC swings. As will be seen, there are a rheostat 251 and a resistor 252 connected in series between the output and the inverting input of the operational amplifier 245 so that its closed loop gain can be set at a desired nominal level. Preferably, however, to prevent the threshold detector 246 from being overdriven, the swings of the operational amplifier 245 are limited. To accomplish that a pair of parallel connected, oppositely poled Zener diodes 253 and 254 are connected across the rheostat 251 and the resistor 252 and a pair of blocking diodes are connected in series with and poled to prevent forward conduction of the Zener diodes 253 and 254 respectively. Consequently, the output of the operational amplifier 245 tends to swing about a DC level, with the amplitude of the swing being proportional to the amount of current being drawn by the transceiver 58 so long as the swing remains within predetermined limits. Of course, those limits are selected to preclude any limiting from taking place when the transceiver 58 is not running.

The threshold detector 246 provides a message in progress signal whenever the average amplitude of the output swings of the operational amplifier 245 exceeds a predetermined threshold level. More particularly, as shown, the threshold detector 246 comprises an operational amplifier 261 which has its inverting input coupled to the output of the operational amplifier 245 by a forwardly poled diode 262 and an averaging circuit 263. The output of the operational amplifier 261 is connected to its non-inverting input by a feedback resistor 264 and its non-inverting input is coupled to the junction between a pair of resistors 265 and 266 which, in turn, are connected across the positive supply source. The averaging circuit 263, on the other hand, includes a series resistor 269 separating a pair of shunt capacitors 267 and 268, together with a shunt resistor 270 connected across the inverting input of the operational amplifier 261 to provide a discharge path for the capacitors 267 and 268. Thus, it will be seen that the averaging circuit 263 responds to the positive swings of the output of the operational amplifier 245 to provide a DC signal which tends to vary in accordance with any variations in the average amplitude of such swings or, in other words, with the amount of current drawn by the transceiver 58. The output of the operational amplifier 261, in turn, switches from a positive saturation level to a negative saturation level to provide a message in progress signal whenever the DC signal exceeds a predetermined threshold level established by the values selected for the resistors 264–266. To insure that the message in progress signal is provided when, but only when, the transceiver 58 is running additional provision may be included to adjust the monitor 193 to the individual characteristics of each different transceiver. For example, as diagrammatically illustrated, means may be provided for adjusting the quiescent current level at the inverting input of the operational amplifier 261 in the field.

Turning finally to the timer 194, it will be seen that it includes another threshold detector 271 and a timing capacitor 272. Once again, the threshold detector 271 comprises an operational amplifier 273 with its output coupled to its non-inverting input by a feedback resistor 274 and its non-inverting input coupled to a junction between a pair of resistors 276 and 277 which, in turn, are connected across the positive supply source. The inverting input of the operational amplifier 273 is returned to ground through the timing capacitor 272, with the result that its output switches from a positive saturation level to a negative saturation level to provide a message complete signal whenever the voltage developed across the timing capacitor 272 exceeds a predetermined threshold level established by the values selected for the resistor 274–276.

As will be seen, the capacitor 272 is connected to the positive supply source via a rheostat 277 and a series resistor 278 and to the negative supply source via the collector-emitter circuit of a NPN-type transistor 281 and a series resistor 282. Consequently, the timing capacitor 272 charges and discharges as the transistor 281 is switched out of and into conduction, respectively, with its charging time constant being determined by the setting of the rheostat 277 and the value of the resistor 278 and its discharging time constant depending primarily on the value of the resistor 282. The transistor 281 is, in turn, switched into or out of conduction depending on whether a diode 289 is forwardly or reversely biased. Specifically, as shown, the base of the transistor 281 is connected to a junction intermediate a pair of resistors 283 and 284 which are connected in series between the negative supply source and the collector of a PNP-type transistor 285. The transistor 285 has its emitter returned to ground and its base connected to a junction of a resistive string 286–288 which is connected at one end to the positive supply source and at its other end to the negative supply source. Finally, a second higher voltage junction on the resistive string 286–288 is connected to the anode of a diode 289, and the values of the individual resistors within the resistive string 286–288 are selected so that the transistors 281 and 285 are switched into or out of conduction depending on whether the diode 289 is forwardly or reversely biased. Accordingly, when the diode 289 is reversely biased, the time out period is running since the capacitor 272 is then charging toward the threshold level for the operational amplifier 271. Contraiwise, when the diode 289 is forwardly biased, the timer 194 is reset since the timing capacitor 272 then discharges. Typically, the rheostat 277 is set to establish a time out period of about thirty seconds to insure that the message complete signal applied to terminal FF is not prematurely generated, but in some instances it may be desirable to shorten it somewhat. Thus, the rheostat 277 is adjustable so that the time out period may be reduced down to, say, 5 seconds.

The information content of the ring detect, message in progress, and message complete signals, is entirely conveyed by the presence of absence of those signals. They, therefore, lend themselves to digitalization, with the result that advantage may be taken of the inherent simplicity of digital logic circuitry for processing those signals. In the illustrated embodiment, to carry out the digitalization, the outputs of the operational amplifiers 233, 261 and 273 are connected through separate series buffer resistors 291–293 and to the cathodes of separate diodes 294–296. The diodes 294–296 have their cathodes returned to ground through separate reversely poled diodes 301–303 and their anodes connected to the positive logic source by respective voltage dropping resistors 297–299. Thus, for example, when a ring detect signal is present, the output of the operational amplifier 233 is at a negative saturation level and the diodes 294 and 301 are, therefore, forwardly biased so that a low 0 logic level voltage is then developed thereacross. Otherwise, the output of the operational amplifier 233 is at a positive saturation level so that the diodes 294 and 301 are reversely biased, with the result that a high 1 logic level voltage is developed thereacross. Consequently, the digitalized ring detect signal is at a low 0 or a high 1 logic level depending on whether a ring detect signal is present or not. Similarly, the digitalized message in progress signal is at a low 0 or high 1 logic level depending on whether a message in progress signal is present or not, and the digitalized message complete signal is at a low 0 or a high 1 logic level depending on whether a message complete signal is present or not.

The basic timing of the control signal for the relay driver 191 is controlled by a bistable means 305 and an AND gate 306 in response to the ring detect, message in progress, and message complete signals. To that end, the output of the AND gate 306 is coupled to the cathode of a diode 307 which has its anode coupled to one junction of a resistive string 308–310 at the input of the relay driver 191.

Considering the relay driver 191 in additional detail, it will be seen that the resistive string 308–310 has one end connected to the positive supply source and its opposite end connected to the negative supply source. A second, lower voltage junction on the resistive string 308–310 is connected to the base of a PNP transistor 311 which has its emitter returned to ground and its collector coupled to the base of a NPN transistor 312 by a current limiting resistor 313. The transistor 312 in turn, has its base coupled to its emitter and to the negative supply source by a bias resistor 315, and the collector of the transistor 312 is coupled to the positive supply source through the coil of the relay K1 and a parallel reversely poled diode 314. Hence, to control the relay K1, the values of the individual resistors of the resistive string 308–310 are selected so that the transistors 311 and 312 switch into or out of conduction depending on whether the diode 307 is forwardly or reversely biased or, in other words, depending on whether the AND gate 306 is disabled or enabled. Thus, it will be appreciated, that the relay K1 is pulled in or energized when the control signal appearing at the output of the AND gate 306 is at a low 0 logic level and dropped out or de-energized when such control signal is at a high 1 logic level.

In the illustrated embodiment, the bistable means 305 comprises a pair of NAND gates 321 and 322, with each of those gates having one of its three inputs coupled to the output of the other to effectively form a flip-flop circuit. The remaining inputs of the NAND gate 321 are coupled to receive the digitalized ring detect and message in progress signals, respectively, while one of the remaining inputs of the NAND gate 322 is coupled to receive the ditigalized message complete signal. The AND gate 306, on the other hand, has one input coupled to the output of the NAND gate 322 and its other input coupled to receive the digitalized message in progress signal. As subsequently described in additional detail, provision has been made to temporarily inhibit the controller from responding to a ring detect signal after each transmission to or by the transceiver 58. For that reason, the digitalized ring detect signal is applied to the NAND gate 321 via an inverter 232 and another NAND gate 324, and the final or third input of the NAND gate 322 is connected to the resistive logic source by a voltage dropping resistor 325 and returned to ground through a normally open reset switch 320. Thus, it will be helpful to start with the assumptions that the NAND gate 324 is disabled or enabled depending on whether the digitalized ring detect signal is at a low 0 or a high 1 logic level and that the reset switch is open inasmuch as the bistable means or flip-flop circuit 305 then responds to the ring detect, message in progress, and message complete signals.

In accordance with one of the more detailed aspects of this invention, undesirable noise or transients which may accompany the digitalized ring detect, message in progress and message complete signals tend to be rejected. To accomplish that, a transistor 326, which is connected in an emitter follower configuration with its base shunted to ground through a bypass capacitor 327, is used to couple the output of the NAND gate 322 to the appropriate inputs of the AND gate 306 and of the NAND gate 321. Specifically, the transistor 326 has its base connected to the output of the NAND gate 322 by a current limiting resistor 328, its collector connected to the positive logic source by a voltage dropping resistor 329, and its emitter coupled to the negative supply source by a load resistor 331. The input signals for the AND gate 306 and the NAND gate 321 are taken from the emitter of the transistor 326 which is, therefore, returned to ground through a reversely poled diode 332. As will be appreciated, the filtering action afforded by the capacitor 326 tends to reject any high frequency noise but otherwise the voltage developed across the diode 332 faithfully follows the output of the NAND gate 322.

It may be helpful to briefly review the operation of the flip-flop circuit 305 and the AND gate 306 at this point. When power is applied, the emitter of the transistor 326 is initially at a low (0) logic level. Thus, the AND gate 306 is disabled thereby providing a low (0) logic level control signal for the relay driver 191, while the NAND gate 321 is enabled to provide a high (1) logic level input signal for the NAND gate 322. The other inputs of the NAND gate 322 are both at high (1) logic levels and it is, therefore, disabled so that the transistor 326 remains in its non-conductive state, thereby causing the flip-flop circuit 305 to stabilize in a first or, say, set state. The relay K1 is pulled in in response to the low (0) logic level control signal provided by the AND gate 306, with the result that the contacts K1A are closed, thereby energizing the motor 109 to move the carriage 105 (FIG. 5) to its fully extended or OFF HOOK position. The same control signal is, however, coupled through an inverter 338 to one input of an AND gate 334, which, in turn, has its other input coupled to receive the digitalized message in progress signal and its output coupled to the anode of the diode 289 at the input of the timer 194. When power is first applied, no message in progress signal is present and the digitalized message in progress signal is, therefore, at a high (1) logic level. Accordingly, the AND gate 334 is enabled, thereby reversely biasing the diode 289 so that the timer 194 starts to time out as the carriage 105 moves to its OFF HOOK position.

As will be recalled, the capacitor 272 charges toward the threshold level of the threshold detector 271 while the timer 194 is timing out so that the voltage developed across the capacitor 272 reaches the threshold level when the predetermined time out period expires. Thus, when the time out period expires, there is a message complete signal provided by the timer 194, with the result that the digitalized message complete signal then drops to a low (0) logic level. As a result, the NAND gate 322 is then enabled, thereby causing the transistor 326 to switch into conduction so that high (1) logic level input signals are applied to the associated inputs of the AND gate 306 and the NAND gate 321. The digitalized ring detect and message in progress signals are both now at high (1) logic levels. Hence, the NAND gate 321 is disabled so that it provides a low (0) logic level input signal for the NAND gate 322, thereby causing the flip-flop circuit 305 to stabilize in its second or reset state, with the result that the control signal for the relay driver 191 goes to a high (1) logic level. Therefore, the diode 307 is back biased and the AND gate 334 is disabled so that the diode 289 is forwardly biased. Consequently, when the time out period expires the timer 194 is reset and the relay K1 is dropped out. Thus, the motor 109 is again energized to move the carriage 105 to its fully retracted or ON HOOK position. Finally, when the carriage 105 reaches its ON HOOK position, the limit switch 123 is opened to de-energize the motor 109 and the controller is then ready to respond to any incoming calls to the telephone set 59 and to any transmissions to or by the transceiver 58.

If a ring detect signal is subsequently provided by the detector 192, the digitalized ring detect signal drops to a low (0) logic level. In view of the earlier assumption that the other inputs to the NAND gate 324 are at a high (1) logic level, the low (0) logic level digitalized ring detect signal enables the NAND gate 325, thereby causing the NAND gate 325 to apply a high (1) logic level input signal to the NAND gate 321. Now, it has been assumed that the reset switch 320 is open and it was mentioned that the timer 194 is reset when the controller is in its ON HOOK ready condition. Thus, it will be recognized that the high (1) logic level input signal provided by the NAND gate 321 disables the NAND gate 322 so that the transistor 326 is switched out of conduction to disable the AND gate 306 as the flip-flop circuit 305 switches to its first or set state. There is then a low (0) logic level control signal for the relay driver 191. Consequently, the relay K1 is pulled in so that the motor 109 is energized to move the carriage 105 to its fully extended or OFF HOOK position and, at the same time, the AND gate 334 is enabled so that the timer 194 starts to time out.

The carriage 105 is returned to its fully retracted or ON HOOK position and the timer 194 is reset, if a message in progress signal is not provided for one reason or another before the time out period expires. Thus, there is substantial protection against the terminal 52 being tied up for a long period of time by, say, a prank or misrouted call. If, however, a timely message in progress signal is provided, the digitalized message in progress signal will drop to a low (0) logic level, thereby latching the flip-flop circuit 305 in its first or set state and disabling the AND gate 334. Consequently, the timer 194 will reset without providing a message complete signal and the carriage 105 will remain in its fully extended or OFF HOOK position. Therefore, when the message in progress signal is interrupted, the AND gate 334 will be enabled as the digitalized message in progress signal goes to a high (1) logic level and, therefore, a new time out period will be initiated by the timer 194. If the message in progress signal reappears before the new time out period expires, the timer 194 will once again be reset, but the state of the flip-flop circuit 305 will not be changed. Contraiwise, if the time out period expires without the reappearance of a message in progress signal, it will be effectively confirmed that the transmission to or by the transceiver 58 has been completed and a message complete signal will be provided. Hence, the digitalized message complete signal then drops to a low (0) logic level thereby enabling the NAND gate 322 so that the transistor 326 is switched into conduction. At this point, the digitalized ring detect and message in progress signals are both at high (1) logic levels. Thus, when the transistor 326 switches into conduction, the NAND gate 321 is disabled to latch the flip-flop circuit 305 in its second or reset state and the AND gate 306 is enabled, thereby providing a high (1) logic level control signal for the relay driver 191. The cycle is then complete, since the high (1) logic level control signal causes the relay K1 to drop out so that the motor 109 is energized to return the carriage 105 to its retracted or ON HOOK position and also causes the AND gate 334 to be disabled so that the timer 194 is reset.

In keeping with another of the more detailed aspects of this invention, the logic circuitry further includes a manually resettable inhibit circuit 340 which is activated whenever there is a transmission to or by the transceiver 58 to prevent the controller from responding to incoming calls subsequently received by the telephone set 59 without the prior intervention of an operator. Accordingly, protection is provided against possible failures in connection with remotely initiated transmissions to or by the transceiver 58. For example, since the inhibit circuit must be manually reset by the operator after each transmission to or by the transceiver 58 before the controller will respond to any further incoming calls, there is a reduced risk that the operator will fail to insert a new record sheet into the transceiver 58 as is necessary to ready a Xerox 400 Telecopier for operation in its receive mode.

As shown, the inhibit circuit 340 includes the NAND gate 324 and another bistable means 341. Again, the bistable means 341 comprises a pair of NAND gates 342 and 343, each having a first input coupled to the output of the other to form a flip-flop circuit. As will be seen, the NAND gate 342 has its other input coupled to receive the digitalized message in progress signal, while the NAND gate 343 has its other input coupled to the positive logic source by the voltage dropping resistor 325 and returned to ground through the normally open reset switch 320. Further, to reject any noise or transients which may be present, the aforementioned coupling of the output of the NAND gate 342 to the first input of the NAND gate 343 is effected through a transistor 344 which is connected in an emitter follower configuration with its base shunted to ground through a bypass capacitor 345 and its emitter shunted to ground through a reversely poled diode 346. As will be appreciated, the voltage developed across the diode 346 is relatively free of noise or transients, but otherwise closely follows the output of the NAND gate 342, inasmuch as the transistor 344 has its base connected to the output of the NAND gate 342 by a current limiting resistor 347, its collector connected to the positive logic source by a voltage dropping resistor 348 and its emitter connected to the negative supply source by a load resistor 349.

Like the flip-flop circuit 305, the flip-flop circuit 341 initially stabilizes in a first or set state. That is, when power is first applied, the emitter of the transistor 344 is at a low (0) logic level and the digitalized message in progress signal is at a high (1) logic level. As a result, the NAND gate 343 is enabled and, consequently, the NAND gate 342 is disabled. The transistor 344, therefore, remains in its non-conductive state so that a low (0) logic level input signal is applied to the NAND gate 343 to latch the flip-flop circuit 341 in its first or set state.

As illustrated, the NAND gate 324 has one input coupled to receive the inverted digitalized ring detect signal from the inverter 323, another input coupled to the output of a NAND gate 352. One input of the AND gate 351 is tied to the positive logic source by a resistor 353, and the other input of that gate is coupled to the positive logic source by the voltage dropping resistor 325 and returned to ground through the normally open reset switch 320. The AND gate 351 is, therefore, enabled and thus applies a high (1) logic level input signal to the NAND gate 324 at all times except when the reset switch 320 is closed. The NAND gate 325, on the other hand, has one input connected to the positive logic source by a resistor 354 and its other input coupled to the emitter of the transistor 344 (or, in other words, to the output of the NAND gate 342). Hence, when the flip-flop circuit 341 is in its first or set state, the NAND gate 352 is enabled so that it also provides a high (1) logic level input signal to the NAND gate 324. As will be recognized under the above described conditions, the NAND gate 324 will be enabled or disabled depending on whether the digitalized ring detect signal is at a high (1) or a low (0) logic level. Consequently, the digitalized ring detect signal will be effectively applied to the NAND gate 321 to cooperate with the message in progress and message complete signals, as previously described.

The inhibitor circuit 340 is activated upon the appearance of a message in progress signal from the monitor 193. At that time, the digitalized message in progress signal drops to a low (0) logic level and the NAND gate 342 is, therefore, enabled so that the transistor 344 is switched into conduction, thereby applying high (1) logic level input signals to the NAND gates 343 and 352. The other inputs of the NAND gates 343 and 352 are both at high (1) logic levels at this point, with the result that they are both disabled when the transistor 344 switches into conduction. Thus, the NAND gate 343 then applies a low (0) logic level input signal to the NAND gate 342 so that the flip-flop circuit 341 is latched in its second or reset state. At the same time, the NAND gate 352 applies a low (0) logic level input signal to the NAND gate 342 so that it is enabled, regardless of the logic level of the digitalized ring detect signal, thereby inhibiting the controller from responding to any detect signal that may be provided.

As will be seen, the inhibit circuit 340 is manually resetable. Specifically, when the operator closes the reset switch 320, a low (0) logic level input signal is applied to the NAND gate 343. The NAND gate 343 is, therefore, enabled so that it applies to a high (1) logic level input signal to the NAND gate 342. If a message in progress signal is present, the NAND gate 342 will remain in its enabled state and the attempt to reset the inhibit circuit will be ineffective. Otherwise, however, the high (1) logic level input signal from the NAND gate 343 disables the NAND gate 342, thereby causing the transistor 344 to swtich out of conduction so that the low (0) logic level input signals are then applied to the NAND gates 343 and 352. Accordingly, the flip-flop circuit 341 reverts to and latches in its first or set state, and the NAND gate 352 is enabled. Finally, when the reset switch 320 is released to return to its normally open condition, the AND gate 351 is also enabled, with the result that the output of the transistors 363 and 364 are switched into or out of conduction to light or extinguish the lamp 362 depending on whether the NAND gate 365 is disabled or enabled.

Specifically, as shown, the transistor 363 is a PNP-type having its emitter returned to ground and its collector coupled to the base of the transistor 364 by a current limiting resistor 365. The transistor 364, on the other hand, is a NPN-type with its base coupled to its emitter and to the negative supply source by a bias resistor 366 and its collector coupled to the positive supply source through the lamp 362 and a reversely poled diode 367. The diode 367 is included simply to provide a path for discharging any current the lamp 362 may tend to store. Hence, when the NAND gate 365 is enabled, it supplies a high (1) logic level output signal which back biases the diode 371, thereby causing the voltage at the base of the transistor 363 to become sufficiently positive to hold the transistor 363 and, thus, the transistor 364 in their non-conductive states. Accordingly, no current is drawn through the collector-emitter circuit of the transistor 364 and the lamp 362 is, therefore, extinguished. But, when the NAND gate 365 is disabled, the diode 371 is forwardly biased. Consequently, the voltage at the base of the transistor 363 becomes sufficiently negative to switch the transistor 363 into conduction. That, of course, causes the transistor 364 to switch into conduction, with the result that current is then drawn through its collector-emitter circuit to light the lamp 367.

The indicator circuit 361 also includes an oscillator 371 which suitably comprised of an operational amplifier 372 having its inverting input connected to the negative supply source by a capacitor 373, its non-inverting input returned to ground by a drift stabilizing resistor 375, and its output coupled to its inverting and its non-inverting inputs by respective feedback resistors 376 and 377. The value of the resistor 376 is selected to be appreciably larger than that of the resistor 377 so that the output of the operational amplifier 372 oscillates between predetermined positive and negative values at a frequency say, 1 Hz., determined by the rate at which the capacitor 373 charges and discharges.

As shown, the periodic A.C. signal provided by the oscillator 371 is digitalized to provide a periodic pulse train. To that end, in the illustrated embodiment, the output of the operational amplifier 372 is coupled to the cathode of a diode 381 by a buffer resistor 382. The diode 381 has its cathode returned to ground through a reversely poled diode 383 and its anode coupled to one end of a voltage dropping resistor 384 which is connected at its opposite end to the positive logic source. Consequently, the diode 381 is reversely or forwardly biased depending on whether the output of the operational amplifier 372 is positive or negative. As a result, a pulse train, which varies between a high (1) logic level and a low (0) logic level at a repetition rate corresponding to the frequency of the oscillating signal provided by the operational amplifier 372, is developed across the diodes 381 and 383.

As will be seen, the NAND gates 366 and 367 and the AND gate 368 vary the visual signal provided by the lamp 362 in accordance with any variations in the status of the controller so that the indication provided by the lamp 362 is an accurate representation of the existing status of the controller. To accomplish that the NAND gate 366 has one input coupled to receive the periodic pulse train supplied by the oscillator 371 and its other input coupled to the emitter of the transistor 344 (or, in other words, to the output of the NAND gate 342). Further, the NAND gate 367 has one input coupled to the output of the NAND gate 343 and its other input coupled by an inverter 385 to the output of the AND gate 351. And, finally the AND gate 368 has its inputs tied together and coupled to the output of the AND gate 306. Recalling now that the NAND gates 366 and 367 and the AND gate 368 are a "wired NOR" circuit (i.e., their commonly connected outputs are all at a low (0) logic level if any one of them is disabled), it will be seen that the lamp 362 is extinguished if the carriage 105 (FIG. 5) is moving toward or resting in its OFF HOOK position or lit if the carriage 105 is moving toward or resting in its ON HOOK position unless the controller is inhibited by the inhibitor circuit 340 at which time the lamp 362 flashes ON and OFF. Specifically, when the carriage 105 is moving toward or resting in its OFF HOOK position, the AND gate 306 is disabled, thereby disabling the AND gate 368 to, in turn, enable the NAND gate 364. Consequently, the diode 373 is back biased, and the transistor 363 and 364 are, therefore, held in their non-conductive states to extinguish the lamp 362. When, on the other hand, the carriage 105 is moving toward or resting in its ON HOOK position, the NAND gate 367 and the AND gate 368 are both enabled. Further, the NAND gate 366 is also enabled, unless the controller is inhibited by the inhibitor circuit 340. Accordingly, assuming that the controller is uninhibited, the NAND gate 365 is disabled, with the result that the diode 373 is forwardly biased to hold the transistors 363 and 364 in conduction so that the lamp 362 is then lit. Finally if the carriage 105 is moving toward or resting in its ON HOOK position and the controller is inhibited, the NAND gate 366 and, therefore, the NAND gate 365 are periodically enabled and disabled so that the transistors 363 and 364 alternately switch out of and into conduction, thereby causing the lamp 362 to alternately flash ON and OFF. Of course, the status of the transceiver 58 may be readily inferred given the status of the controller. Most importantly, if the lamp 362 is flashing, it may be inferred that a message has been transmitted to or by the transceiver 58.

A Xerox 400 Telecopier transceiver comprises an internal tone signal generator (not shown) which is enabled (by means not shown) when the transceiver is ready to receive a message. A ready signal comprising an interrupted series of "ready signal tones" is generated by modulating the power for the transceiver 58 ON and OFF. Conventionally, such modulation takes place when a handset is inserted into the acoustical coupler of the transceiver while the unit is in its receive mode. Hence, however, it is contemplated that the handset will be inserted in the coupler while the telephone set 59 is still ON HOOK. Accordingly, in keeping with a further detailed aspect of this invention, special provision has been made for modulating the power for the transceiver 58 ON and OFF starating as the carriage 105 (FIG. 5) moves towards its fully extended or OFF HOOK position and continuing until a transmission to or by the transceiver 58 is initiated.

More particularly, to carry out this feature of the invention, the switch 131 and the normally open relay controller contacts K2A are connected in series with the power pick-up jacks 154 for the transceiver 58, as previously described. Further, means are provided for periodically pulling in and dropping out the relay K2 to alternately open and close the contacts K2A from the time that a ring detect signal is provided until the time a message in progress signal is provided. Thereafter, the relay K2 is maintained in an energized or pulled in state until the time a message complete signal is provided. To control the relay K2, there is another NAND gate 386 which has one input coupled to the output of the AND gate 334 and another input coupled to receive a periodic pulse train from an oscillator 387. Thus, the NAND gate 386 is enabled by a low (0) logic level input signal from the AND gate 334 whenever the carriage 105 is moving toward or resting in its ON HOOK position and whenever a message in progress signal is present. When, however, the carriage 105 is moving toward or resting in its OFF HOOK position in the absence of a message in progress signal, the NAND gate 386 is periodically enabled and disabled in response to the pulses provided by the oscillator 387. As will be seen, a driver circuit 410 pulls in and drop out the relay K2 depending on whether the NAND gate 386 is disabled or enabled.

Suitably, the oscillator 387 comprises an operational amplifier 391 having its inverting input coupled to the negative supply source by a capacitor 392, its non-inverting input returned to ground by a drift stabilizing resistor 393, and its output coupled to its inverting and non-inverting inputs by feedback paths. Specifically, as shown, the regenerative feedback path from the output ot the non-inverting input of the operational amplifier 391 is provided by a simple feedback resistor 394. But, the negative feedback path between the output and the inverting input of the operational amplifier 391 includes a pair of parallel connected feedback resistors 395 and 396 which are connected in series with respective ones of a pair of oppositely poled diodes 397 and 398. Thus, the charging and discharging time constants for the capacitor 392 are dependent on the values of the resistors 395 and 396 and, therefore, need not be identical. Indeed, for a 400 Telecopier transceiver, the resistor 395 is selected to have s significantly greater value than the resistor 396 so that the charging time constant for the capacitor 392 is appreciably longer than its discharging time constant.

As will be appreciated, the output of the operational amplifier 391 swings between predetermined positive and negative levels as the capacitor 392 charges and discharges, with the frequency of the such swings being determined by the rates at which the capacitor 392 charges and discharges. The pulse train for the NAND signal provided by the oscillator 387. To accomplish that, the output of the operational amplifier 392 is coupled to the cathode of a diode 401 by a buffer resistor 402. The diode 401 has its cathode returned to ground by a reversely poled diode 403 and its anode coupled to the positive logic source by a voltage dropping resistor 404. Thus, a pulse train having a repitition rate determined by the frequency of the A.C. signal from the oscillator 387 and a duty ratio determined by the charging and discharging time constants for the capacitor 392 is developed across the diodes 401 and 403 which are, in turn, connected across one input of the NAND gate 386.

As shown, the driver circuit 410 for the relay K2 has a resistive string 411–413 at its inputs and includes a pair of cascade connected transistors 414 and 415 which are switched into or out of conduction to pull in or drop out the relay K2 depending on whether the NAND gate 386 is disabled or enabled. Specifically, in the illustrated embodiment, the output of the NAND gate 386 is coupled to the cathode of a diode 416 which, in turn, has its anode coupled to a first, relatively high voltage junction on the resistive string 411–413. One end of the resistive string 411–413 is connected to the positive supply source and its opposite end is connected to the negative supply source, and a second, relatively low voltage junction thereof is connected to the base of the transistor 414. The transistor 414 is a PNP-type having its emitter returned to ground and its collector coupled to the base of the transistor 415 by a current limiting resistor 417. The transistor 416 is, in turn, a NPN-type with its base coupled to its emitter and to the negative supply source by a bias resistor 418 and its collector coupled to the positively supply source through the control coil of the relay K2 and a parallel connected, reversely poled diode 419. Consequently, the values of the individual resistor of the resistive string 411–413 may be easily selected to cause the transistors 414 and 415 to switch out of conduction to drop out of de-energize the relay K2 when the NAND gate 386 is enabled (i.e., when the diode 416 is reversely biased).

In the interest of simplifying the testing and trouble-shooting of the controller, provision is made to permit the controller to by cycled at will, without placing a call to the telephone set 59 or running the transceiver 58. For that reason, the output of the AND gate 306 is coupled to the anode of a diode 421 which has its cathode returned to ground through a normally open switch 422. Under quiescent conditions, the output of the AND gate 306 is normally at a high (1) logic level. If, however, the switch 422 is closed, the output of the AND gate 306 is clamped to a low (0) logic level by the diode 421. Thus, the switch 422 may be manually opened and closed to simulate the normal response of the controller to the ring detect, message in progress and message complete signals.

As an alternative to maintaining the controller in step with the transceiver 58 while the controller is disabled in its manual mode, the cam operated switch 126 (FIGS. 5–15) may be substituted for the switch 422 (FIG. 16C). As will be recalled, the switch 126 is open or closed depending on whether the controller is enabled or disabled. Thus, when the substitution is made, the carriage 105 is held in its fully extended or OFF HOOK position while the controller is disabled, thereby insuring that any transmission to or by the transceiver 58 will not be prematurely interrupted when the controller is re-enabled. Specifically, when the controller is re-enabled, the carriage 105 at least initially remains in its OFF HOOK position, and thereafter return to its ON HOOK position only if the timer 194 times out to confirm that there is no on-going transmission to or by the transceiver 58.

Turning now to FIGS. 17A–17D, it will be seen that many of the features of the control circuit for the controller 52 (FIG. L) have counterparts in the above-described control circuit for the controller 52. Hence, identical reference numerals have been used for those components which are found in both control circuits so so that it will here suffice to concentrate on the unique characteristics of the control circuit for the controller 52.

For the most part, the unique characteristics of the control circuit shown in FIGS. 17A–17D follow directly from the assumption that the transceiver 54 is a Xerox Telecopier III unit. Thus, it should be noted at the outset that the terminals shown at 501–508 are intended to be connected (by means not shown) to the points within the transceiver 54 which have been identified by the labels applied to those terminals. Further, it should be understood that the following conditions exist when the transceiver 54 is ready to operate: the dorr switch (ground closed) terminals 501 is grounded, the door switch (ground open) terminal 502 leads to an open circuit, the S mode terminal 503 is at +18 volts D.C. or −18 D.C. depending on whether the transceiver 54 is in a transmit mode or a receive mode, the coupler interlock terminal 54 is at +18 volts D.C., the platen loaded terminal 505 leads to an open circuit, and the −18 v. supply terminal 506 is at −18 volts D.C., and the 360 Hz. terminals 507 and 508 are receiving opposite phases of a 360 Hz. signal or at −18 volts D.C. depending on whether the transceiver 54 is running or not.

The AND gate 351 is again enabled or disabled depending on whether the reset switch 320 is open or closed. To that end, it again has one input coupled to the reset switch 320 and the voltage dropping resistor 325, but its other input is coupled to the commonly connected outputs of three NAND gates 511–513 by an inverter 514. As shown, the NAND gate 511 has one of its inputs coupled to one of the inputs of the NAND gate 512 which, in turn, has another of its inputs coupled to one of the inputs of the NAND gate 513.

The door switch terminal 502 is coupled to the commonly connected input terminals of the NAND gates 511 and 512 and those inputs are connected to the positive logic source by a voltage dropping resistor 353*b* so that they are at a high (1) logic level or a low (0) logic level depending on whether the front cover or door of the transceiver 54 is closed or open. Thus, if the transceiver 54 is not ready to operate because of an open front cover, the NAND gates 511 and 512 are both enabled inasmuch as the door switch terminal 502 is then grounded. The door switch terminal 501 is coupled to the remaining input of the NAND gate 511 and the input is connected to the positive logic source by a voltage dropping resistor 353*a*, with the result that the NAND gate 511 is enabled even if the front cover of the transceiver 54 is open since the door switch terminal 501 is then open circuited. Accordingly, it will be recognized that the NAND gate 511 is included as a simple concession to the objective of permitting a single control circuit to be used for both of the controllers. Specifically, the NAND gate 511 is disabled only if the door switch terminals 501 and 502 are both open circuited as they would be if used with the transceiver 58, with the result that the function of the voltage dropping resistor 353 (FIG. 16) would then be carried out by the voltage dropping resistors 353*a* and 353*b* (FIG. 17).

Returning for the time being to the characteristics of the controller 52, it will be seen that the S mode terminal 501, the coupler interlock terminal 504 and the platen load terminal 505 are coupled to the cathodes of respective diodes 521–526. The diodes 521–523 have their cathodes returned to ground through separate reversely poled diodes 527–529 and their anodes coupled to the positive logic source by respective voltage dropping resistors 531–533. The voltage developed across the diodes 521–527, which is at a high (1) or a low (0) logic level depending on whether the transceiver 54 is in a transmit or a receive mode, is applied to an inverter 534. The output of the inverter 534 is coupled to an input of the NAND gate 513 and, through another inverter 535, to an input of the NAND gate 512. Hence, the NAND gate 562 is enabled if the transceiver 54 is in its receive mode, and the NAND gate 513 is enabled if the transceiver 54 is in its transmit mode. The voltage developed across the diodes 522 and 528, which is at a high (1) or a low (0) logic level depending on whether telephone hand set has been properly seated in the acoustic coupler (FIG. 1), is applied to the interconnected inputs of the NANd gates 512 and 513. And, the voltage developed across the diodes 523 and 529, which at a high (1) or a low (0) logic level depending on whether the platen (not shown) of the transceiver 54 is loaded with paper or not, is applied to the remaining input of the NAND gate 513. Thus, the NAND gate 512 is enabled (i.e., all of its inputs are at a high (1) logic level) if the transceiver 514 is in its transmit mode, provided that its front cover is closed and the hand set of the associated telephone 55 is properly seated in the coupler 56 (FIG. 1). Contraiwise, the NAND 513 is disabled when the transceiver 54 is in its receive mode, provided that the hand set of the telephone 55 is properly seated in the coupler 56 and the platen of the transceiver 54 is loaded with recording paper. As will be appreciated, there is a high (1) logic level input signal for the AND gate 351 if anyone of the NAND gates 511–513 are disabled. They effectively form a wired NOR circuit 534 inasmuch as their interconnected outputs are all at a low (0) logic level if anyone of them is disabled.

As will be seen, there is a monitoring circuit 536 for providing a message in progress signal when the transceiver 54 is running. In this instance, the message in progress signal is provided in response to the opposite phases of the 360 Hz. signal which appear at the 360 Hz. terminals 507 and 508 when the transceiver is running, and the digitalization of the message in progress signal is carried out by switching a transceiver 544 into conduction when the message in progress signal is present and out of conduction when the message in progress signal is absent. As shown, the transistor 544 has its emitter returned to ground and its collector coupled to the positive logic source by a voltage dropping resistor 545. Accordingly, it will be understood that the digitalized message in progress signal is again at a low (0) or a high (1) logic level depending on whether a message in progress signal is present or not. More particularly, in the illustrated embodiment, the 360 Hz. terminals are connected to the anodes of respective diodes 537 and 538. The cathodes of the diodes 537 and 538 are tied together and connected to a first, relatively low voltage junction on a resistive string 541–543, which has one end connected to the negative supply source. A second, higher voltage junction on the resistive string 541–543 is coupled to the base of the transistor 544, and the values of the individual resistors of the resistive string 541–543 are selected so that the base-emitting junction of the transistor 544 is back biased unless one or the other of the diodes 537 and 538 is forwardly biased. As will be recalled, when the transceiver 54 is idle, the 360 Hz. terminals 507 and 508 are both held at approximately −18 volts D.C. Consequently, the base-emitter junction of the transistor 544 is then back biased, say, by the voltage developed across a reversely poled diode 546, thereby holding the transistor 544 in its non-conductive state so that the digitalized message in progress signal is maintained at high (1) logic level. But, when the transceiver 54 is running, opposite phases of a 360 Hz. signal are applied to the 360 Hz. terminals 507 and 508 such that the diodes 537 and 538 are then alternately forwardly biased to provide a message in progress signal. A capacitor 547 is connected in shunt with the base-emitter junction of the transistor 544 to filter the A.C. components from the message in progress signal and, therefore, the transistor 544 is held in conduction to maintain the digitalized message in progress signal at a low (0) logic level while the transceiver 54 is running.

In keeping with another of the move detailed aspects of this invention, provision is made in the control circuit for the controller 52 to simulate an inactivated platen switch condition so that the transceiver 54 will not start to run prematurely when it is in its transmit mode. When a Xerox Telecopier III transceiver is in its transmit mode, it will start to run even while its motor control inputs (ie., the 360 Hz. terminals 507 and 508) are still at −18 volts D.C., provided that its coupler interlock and platen switch are activated. These conditions may, of course, be satisfied in the illustrated embodiment, inasmuch as it is contemplated that the handset of the telephone 55 will be seated within the acoustic coupler 56 (FIG. 1) and an original will be loaded into the transceiver 54 for subsequent transmission while the controller 52 is still holding the telephone 55 ON HOOK. The platen switch inactivated condition is simulated by holding the platen loaded terminal 505 at a negative potential. For that reason, there is a NAND gate 551 with one input connected to the positive logic source by a voltage dropping resistor 354 and its other input coupled to the output of the AND gate 306. A switch 550 is connected between the output of the inverter 535 and the first input of the NAND gate 551, but for the time being it will be assumed that the switch 550 is open. In that event, the NAND gate 551 is disabled by the high (1) logic level signal provided by the AND gate 306 whenever the carriage 105 (FIG. 5) is moving toward or resting in its ON HOOK position. When the NAND gate 551 is enabled, a pair of cascade connected transistors 553 and 554 are switched into conduction to hold the platen loaded terminal at a negative voltage, thereby simulating the inactivated platen switch condition. Specifically, as shown, the output of the NAND gate 551 is connected to the cathode of a diode 555 which has its anode connected to a first, relatively high voltage junction of a resistive string 556–558 which, in turn, is connected between the positive and negative supplies. A second, lower voltage junction on the resistive string 556–558 is connected to the base of the PNP transistor 553, which has its emitter returned to ground and its collector coupled to the base of the NPN transistor 554 by a current limiting resistor 559. As will be seen, the collector of the transistor 544 is connected to the platen loaded terminal 505 and its base is connected to its emitter and to the −18 v. supply terminal 506. Further, the values of the individual resistors is forwardly or reversely biased to switch the transistors 553 and 554 into or out of conduction depending on whether the NAND gate 551 is disabled or enabled. Consequently, the simulated platen switch inactivated condition is eliminated when a ring detect signal is provided by the detector 192 since the output of the AND gate 306 then drops to a low (0) logic level and, therefore, transmissions by the transceiver 54 may be remotely initiated.

When the transceiver 54 is in its receive mode, the transistors 553 and 554 are periodically switched into and out of conduction, starting when a ring detect signal is provided by the detector 192 and continuing until a message in progress signal is provided by the monitor 536, or, lacking that, until a message complete signal is provided by the timer 194. That causes the platen loaded terminal 505 to periodically swing to a negative voltage level, which will be interpreted by a Telecopier III transceiver as a command to transmit a "ready tone" signal. To carry out the periodic switching of the transistors 553 and 554, there is another NAND gate 561 with its output coupled to the cathode of the diode 561. As will be seen, the NAND gate 561 has one input coupled to the output of the AND gate 334 and another input coupled to receive the periodic pulse train from the oscillator 371. As soon as a message in progress signal or a message complete signal is provided, the ready tone signal will be interrupted since the AND gate 334 will then be disabled, thereby enabling the NAND gate 561 to, in turn, latch the transistors 553 and 554 in their conductive states.

The switch 552 is provided so that the controller 52 may be used with or without the roll feed accessory 76 (FIG. 1). When the switch 552 is open, the reset switch 320 must be momentarily closed after each transmission to or by the transceiver 54 to enable the controller to respond to the next incoming call to the associated telephone 55. On the other hand, when the switch 552 is closed, the inhibitor circuit 340 is effectively overriden provided that the transceiver 54 is in its receive mode. Specifically, the low (0) logic level signal appearing under those conditions at the output of the inverter 535 is applied through the switch 552 to the NAND gate 352. Hence, the NAND gate 552 then remains enabled, regardless of the state of the flip-flop circuit 341. Of course, if the paper supply is exhausted, the platen switch will be inactivated. If the transceiver 54 is in its receive mode, the NAND gate 513 will be enabled as soon as the platen switch is inactivated. That, in turn, will cause the AND gate 351 to be disabled, thereby activating the inhibitor circuit 340 to prevent the controller from responding to any further incoming calls.

As previously mentioned, the −18 v. supply terminal 506 is held at −18 volts D.C. under nominal operating conditions. If the voltage at that terminal is significantly higher than its nominal level, a transistor 571 is switched into conduction to activate the inhibitor circuit 340 and disable the monitor circuit 536. In this way, additional protection is provided against faulty operation of the transceiver 54 while the controller 52 is in its automatic mode. More particularly, as shown, the base of the transistor 571 is coupled to the terminal 506 by a forwardly poled diode 572 and a current limiting resistor 573 and is returned to ground through a biasing resistor 574. The transistor 571 has its emitter coupled to the negative supply source by a load resistor 575. The coupler interlock terminal 504 is coupled to the collector of the transistor 571 by a resistor 576 and a diode 577. Similarly, the base of the transistor 544 is coupled to the collector of the transistor 571 by a resistor 578 and a diode 579. As will be appreciated, when the voltage at the terminal 506 is at its nominal level, the transistor 571 is held in its non-conductive state. But, if the voltage at the terminal 506 increases (ie., becomes less negative) the transistor 571 switches into conduction. At that point, the coupler interlock signal is overridden since the voltage developed across the diodes 522 and 528 drops to a low (0) logic level, thereby insuring that the NAND gates 512 and 513 are both enabled. Hence, the AND gate 351 is then disabled, thereby activating the inhibitor circuit 340. At the same time, the base-emitter junction of the transistor 544 is back biased so that the digitalized message in progress signal is latched at a high (1) logic level.

CONCLUSION

In view of the foregoing, it will be understood that controllers for automatically answering and disconnecting calls to and from Xerox Telecopier III and 400 Telecopier transceivers have been provided. More importantly, however, it will be appreciated that many of the principles of the present invention are of generally applicability to the automation of telephone interfaced facsimile terminals, without specific limitation to any particular type of facsimile equipment. Thus, it should be understood that the Xerox Telecopier III and 400 Telecopier transceivers are merely convenient examples of facsimile units with which controllers embodying this invention may be advantageously utilized.

What is claimed is:

1. In a controller for automatically answering the disconnecting calls to and from a cradle switch controlled telephone interfaced with a facsimile unit, said controller including an actuator means for operating said telephone cradle switch and a driver means for moving said actuator means toward and away from said cradle switch to transfer said telephone between an ON HOOK condition and an OFF HOOK condition; a control circuit for sequencing said controller comprising the combination of detector means coupled to said telephone for providing a ring detect signal in response to any ringing voltage applied to said telepone;

monitor means coupled to said facsimile unit for providing a message in progress signal in response to facsimile transmission involving said unit;

timer means coupled to said detector means and said monitor means for providing a message complete signal upon the expiration of a predetermined time out period, said timer means being activated in response to said ring detect singal and being reset in response to said message in progress signal so that said predetermined time out period runs from the last to occur of said ring detect and message in progress signals;

control means coupled to said detector means, monitor means and timer means for conditioning said driver means to move said actuator means away from said telephone cradle switch in response to said ring detect and message in progress signals and toward said telephone cradle switch in response to said message complete signal; and manually resettable inhibitor means activated in response to said message in progress signal for preventing said control means from responding to any subsequent ring detect signal until said inhibitor means is reset.

2. A control circuit according to claim 1 further including means for overridding said inhibitor means so that a plurality of calls may be automatically answered without any intervention by an operator.

3. In a controller for automatically answering and disconnecting calls to and from a cradle switch controlled telephone interfaced with a facsimile unit, said controller including an actuator means for operating said telephone cradle switch and a driver means for moving said actuator means toward and away from said cradle switch to transfer said telephone between an ON HOOK condition and an OFF HOOK condition; a control circuit for sequencing said controller comprising the combination of detector means coupled to said telephone for providing a ring detect signal in response to any ringing voltage applied to said telephone;

monitor means coupled to said facsimile unit for providing a message in progress signal in response to facsimile transmission involving said unit;

timer means coupled to said detector means and said monitor means for providing a message complete signal upon the expiration of a predetermined time out period, said timer means being activated in response to said ring detect signal and being reset in response to said message in progress signal so that said predetermined time out period runs from the last to occur of said ring detect and message in progress signals;

control means coupled to said detector means, monitor means and timer means for conditioning said driver means to move said actuator means away from said telephone cradle switch in response to said ring detect and message in progress signals and toward said telephone cradle switch in response to said message complete signal, said control means including bistable means which first switches to a first stable state in response to the first to occur of said ring detect and said message in progress signals and to a second state in response to said message complete signal, said driver means being conditioned to move said actuator away from and toward said cradle switch when said bistable means is in said first and second states, respectively; and manually resettable inhibitor means activated in response to said message in progress signal for preventing said bistable means from switching to said first state in response to any subsequent ring detect signal unless said inhibitor means has previously been reset.

4. A control circuit according to claim 3 wherein said inhibitor means includes another bistable means which switches from a first stable state to a second stable state in response to said message in progress signal, a manually operable reset switch coupled to said other bistable means to permit said other bistable means to be reset to its first stable state by an operator, and gate means having inputs coupled to said detector means and said second bistable means and an output coupled to the first mentioned bistable means, with said gate means being conditioned to pass said ring detect signal to said first bistable means only when said other bistable means is in its first state.

5. A control circuit according to claim 4 further including selectively actuatable override means coupled to said gate means, said override means being effective when actuated to override said inhibitor means to thereby condition said gate means to pass any ring detect signals to said first bistable means even when said other bistable means is in its second stable state so that a plurality of calls may be automatically answered without any intervention of an operator if so desired.

6. A control circuit according to claim 5 further including means coupled between said facsimile unit and said gate means for preventing said inhibitor means from being overriden whenever said facsimile unit is not conditioned for continued operation.

7. A control circuit according to claim 1 wherein said control means includes a first bistable means coupled to receive said message in progress and message complete signals and gate means coupled to said inhibitor means and to said detector means for passing said ring detect signals to said first bistable means unless inhibitor means is activated, said bistable means being switched to a first stable state to condition said driver means to move said actuator means away from said cradle switch in response to whichever of the ring detect and message in progress signals is first applied to said bistable means and being switched to a second stable state to condition said driver means to move said actuator arm toward said cradle switch in response to said message complete signal.

8. A control circuit according to claim 1 further including indicator means coupled to said control means and said inhibitor means for providing a first indication when the driver means is conditioned to move the actuator means away from the cradle switch, a second indication when the driver means is conditioned to move the actuator means toward the cradle switch while the inhibitor means is reset, and a third indication when the driver means is conditioned to move the actuator means toward the cradle switch while the inhibitor means is activated.

9. A control circuit according to claim 2 further including selectively actuatable override means coupled to said gate means and effective when actuated to condition said gate means to pass said ring detect signal even if said inhibitor means is activated.

10. In a controller for automatically answering and disconnecting calls to and from a cradle switch controlled telephone interfaced with a facsimile unit, said controller including an actuator means for operating said telephone cradle switch and a driver means for moving said actuator means toward and away from said cradle switch to transfer said telephone between an ON HOOK condition and an OFF HOOK condition; a control circuit for sequencing said controller comprising the combination of detector means inductively coupled to said telephone for providing a ring detect signal in response to any ringing voltage applied to said telephone, whereby said detector means responds to any ringing voltage applied to said telephone without requiring any direct electrical connections to said telephone; said detector means including a pick-up coil inductively coupled to said telephone, filter means coupled to said pick-up coil for selectively passing signals induced into said pick-up coil at frequencies with a nominal frequency range for said ringing voltage while suppressing any signals outside said frequency range, and another threshold detector means coupled to said filter means for providing said ring detect signal when the signals passed by said filter means have an average amplitude in excess of a predetermined threshold level;

monitor means coupled to said facsimile unit for providing a message in progress signal in response to facsimile transmission involving said unit;

timer means coupled to said detector means and said monitor means for providing a message complete signal upon the expiration of a predetermined time out period, said timer means being activated in response to said ring detect signal and being reset in response to said message in progress signal so that said predetermined time out period runs from the last to occur of said ring detect and message in progress signals, said timer means including a capacitive means which is selectively charged and discharged as said timer means is activated and reset, respectively, and a threshold detector means coupled to said capacitive means for providing said message complete signal when said capacitive means charges to a predetermined threshold level, said capacitive means having a charging time constant selected so that the charge thereon reaches said threshold level only after an uninterrupted interval of charging approximately equal in duration to said predetermined time out period, whereby said timer means effectively confirms that any transmission involving said facsimile unit has been completed before providing said message complete signal;

control means coupled to said detector means, monitor means and timer means for conditioning said driver means to move said actuator means away from said telephone cradle switch in response to said ring detect and message in progress signals and toward said telephone cradle switch in response to said message complete signal; and means for digitalizing said detect, message in progress and message complete signals; and wherein said control means includes a flip-flop circuit and a coincidence gate, with the flip-flop circuit having respective inputs connected to receive the digitalized ring detect, message in progress and message complete signal and an output connected to one input of said coincidence gate, said coincidence gate having another input connected to receive said digitalized message in progress signal and an output connected to provide a control signal for said driver means; said flip-flop circuit being operated in response to any ring detect or message in progress signal so that said control signal is thereafter held at one logic level to condition its driver means to move said actuator means away from said cradle switch until a message complete signal is provided, whereupon said flip-flop circuit switches to a second stable state, thereby causing said control signal to change to another logic level to condition said driver means to move said actuator means toward said cradle switch.

11. A control circuit according to claim 10 further including a gate means having one input coupled to said coincidence gate, another input coupled to receive said digitalized message in progress signal, and an output coupled to said timer means, said gate means providing a signal at one logic level to activate said timer means when said control signal is at said one logic level in the absence of a message in progress signal and at another logic level to reset said timer means when said control signal is at said other logic level and when said control signal is at said one logic level in the presence of a message in progress signal.

12. A control circuit according to claim 11 further including an indicator means coupled to the output of said coincidence gate to provide a first indication when said driver means is conditioned to move said actuator means away from said cradle switch and a second indication when said driver means is conditioned to move said actuator means toward said cradle switch.

13. A control circuit according to claim 12 further including manually resettable means coupled to receive said digitalized message in progress signal and activated when a message in progress signal is provided subject to being subsequently reset by an operator; and wherein said indicator means is coupled to said manually resettable means and substitutes a third indication for said second indication whenever said manually resettable means is activated while said driver means is conditioned to move said actuator means toward said cradle switch.

14. A control circuit according to claim 13 wherein said manually resettable means includes inhibitor means coupled to said control means for preventing said control means from responding to any ring detect signals that are provided while said manually resettable means is activated.

15. A control circuit according to claim 14 wherein said monitor means includes a current transformer inductively coupled to a current supply circuit for said facsimile unit so that a signal having an amplitude proportional to the current being drawn through said supply circuit by said facsimile unit is induced into said transformer, and a further threshold detector means coupled to said transformer for providing said message in progress signal whenever the average amplitude of the signal induced into said current transformer exceeds a predetermined threshold level.

16. A control circuit according to claim 15 further including modulator means coupled to said supply circuit and responsive to said ring detect message in progress and message complete signals for periodically opening and closing said supply circuit for an interval running from the time a ring detect signal is provided until such time as a message in progress or a message complete signal is provided so that the current applied to said facsimile unit is modulated on and off at a predetermined repitition rate during said interval.

* * * * *

UNITED STATES PATENT AND TRADEMARK OFFICE

CERTIFICATE OF CORRECTION

PATENT NO. : 3,876,837

DATED : April 8, 1975

INVENTOR(S) : Robert J. Gormley/Charles S. Yole

It is certified that error appears in the above-identified patent and that said Letters Patent are hereby corrected as shown below:

Column 4, line 58, change "integraded" to --integrated--.

Column 5, line 6, change "simplfy" to --simplify--.

" " line 13, change "mateched" to --matched--.

Column 6, line 22, change "sections head" to --section headings--

Column 10, line 4, change "Contraiwise" to --Contrariwise--.

" ", line 39, change "reilied" to --relied--.

Column 11, line 24, change "inconsistant" to --inconsistent--.

Column 19, line 10, change "Contraiwise" to --Contrariwise--.

Column 22, line 40, change "Contraiwise" to --Contrariwise--.

Column 24, line 29, change "resetable" to --resettable--.

Column 26, line 44, change "jacks" to --jack--.

Column 27, line 19, omit "s".

Column 28, line 6, change "by" to --be--.

" " , line 56, change "dorr" to --door--.

Signed and Sealed this

*ninth* Day of *December 1975*

[SEAL]

*Attest:*

RUTH C. MASON
*Attesting Officer*

C. MARSHALL DANN
*Commissioner of Patents and Trademarks*